US012688294B2

(12) United States Patent (10) Patent No.: US 12,688,294 B2
Zhang (45) Date of Patent: Jul. 21, 2026

(54) VIRTUAL TRUSTED PLATFORM MODULE IMPLEMENTATION METHOD AND RELATED APPARATUS

(71) Applicant: HUAWEI TECHNOLOGIES CO., LTD., Shenzhen (CN)

(72) Inventor: Lixiao Zhang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 616 days.

(21) Appl. No.: 18/307,041

(22) Filed: Apr. 26, 2023

(65) Prior Publication Data

US 2023/0267214 A1 Aug. 24, 2023

Related U.S. Application Data

(63) Continuation of application No. PCT/CN2021/086100, filed on Apr. 9, 2021.

(30) Foreign Application Priority Data

Oct. 27, 2020 (CN) .......................... 202011159996.2
Nov. 26, 2020 (CN) .......................... 202011353009.2

(51) Int. Cl.
*G06F 21/57* (2013.01)
*G06F 21/53* (2013.01)
*H04L 9/14* (2006.01)

(52) U.S. Cl.
CPC .............. *G06F 21/57* (2013.01); *G06F 21/53* (2013.01); *H04L 9/14* (2013.01)

(58) Field of Classification Search
CPC .............. G06F 21/57; G06F 21/53; H04L 9/14

(Continued)

(56) References Cited

U.S. PATENT DOCUMENTS 10,965,551 B2 * 3/2021 Diaz-Cuellar .......... G06F 21/57
2012/0027213 A1 * 2/2012 Scarlata .................. H04L 67/10
380/283

(Continued)

FOREIGN PATENT DOCUMENTS

CN 109522754 A 3/2019
CN 111353162 A 6/2020
CN 111382445 A 7/2020

OTHER PUBLICATIONS

International Search Report and Written Opinion issued in PCT/CN2021/086100, Jul. 26, 2021, 11 pages.

*Primary Examiner* — Teshome Hailu

(57) ABSTRACT

The present disclosure provides a virtual trusted platform module (vTPM) implementation method, and the method is applied to a computer. A vTPM service component runs in a trusted execution environment of the computer, and a first virtual machine (VM) and a vTPM proxy component run in a rich execution environment of the computer. The vTPM service component obtains first request information from the vTPM proxy component, where the first request information includes an identifier of the first VM, and the first request information is used to request to perform a TPM operation. The vTPM service component processes the first request information based on data in a first storage space, where the first storage space is a storage space in the trusted execution environment and corresponds to the identifier of the first VM in the trusted execution environment, and the first storage space is used to store TPM data of the first VM.

20 Claims, 10 Drawing Sheets

(58) Field of Classification Search
USPC .......................................................... 713/189
See application file for complete search history.

(56) References Cited

U.S. PATENT DOCUMENTS

2016/0350534 A1* 12/2016 Poornachandran ... G06F 21/554
2017/0277869 A1* 9/2017 Liu ....................... H04L 9/0894
2024/0143765 A1* 5/2024 Jungerman ........... H04L 9/3242

* cited by examiner

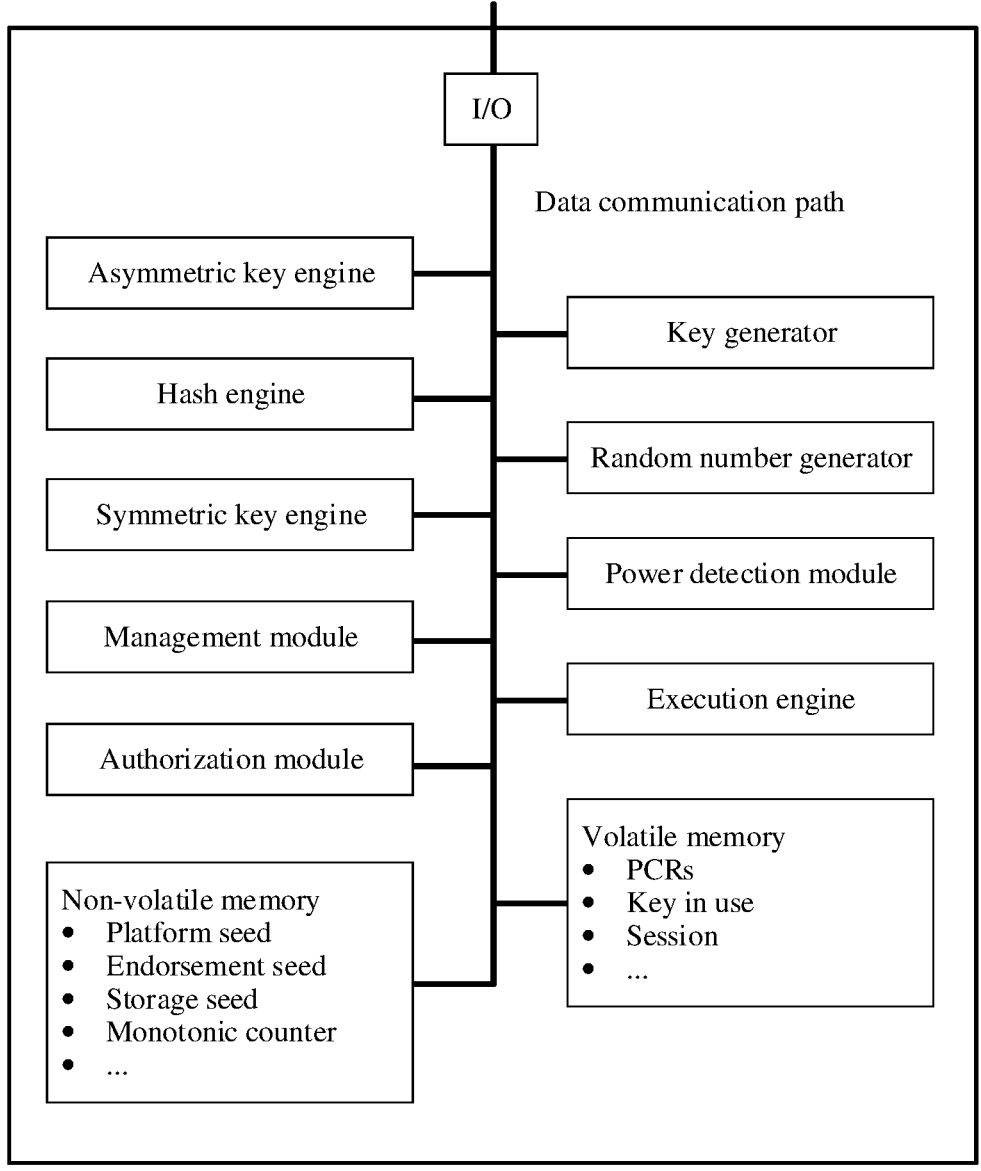

I/O

Data communication path

Asymmetric key engine

Key generator

Hash engine

Random number generator

Symmetric key engine

Power detection module

Management module

Execution engine

Authorization module

Volatile memory
- PCRs
- Key in use
- Session
- ...

Non-volatile memory
- Platform seed
- Endorsement seed
- Storage seed
- Monotonic counter
- ...

I/O: Input/output                    PCRs: Platform configuration register

FIG. 1

VIRTUAL TRUSTED PLATFORM MODULE IMPLEMENTATION METHOD AND RELATED APPARATUS

CROSS-REFERENCE TO RELATED APPLICATIONS

This application is a continuation of International Application No. PCT/CN2021/086100, filed on Apr. 9, 2021, which claims priority to Chinese Patent Application No. 202011159996.2, filed on Oct. 27, 2020, and Chinese Patent Application No. 202011353009.2, filed on Nov. 26, 2020. All of the aforementioned patent applications are hereby incorporated by reference in their entireties.

TECHNICAL FIELD

The present disclosure relates to the field of computer technologies, and in particular, to a virtual trusted platform module (vTPM) implementation method and a related apparatus.

BACKGROUND

A trusted platform module (TPM) is an international standard for secure cryptographic processors. This standard stipulates that a dedicated microcontroller (security hardware) integrated in a device is used to process an encryption key in the device. A dedicated microcontroller that complies with the TPM standard is referred to as a TPM chip. The TPM chip is a small chip system including a cryptographic operation component and a storage component, and is configured to securely store information used to verify security of a platform (for example, a network device such as a personal computer), for example, information such as a password, a certificate, or an encryption key. The TPM chip stores the information, so as to effectively prevent an unauthorized user from modifying sensitive information.

Because the TPM chip has simple logic, the TPM chip cannot support a virtualization feature, that is, cannot simultaneously provide TPM services for a plurality of virtual machines (VM). Therefore, in a related technology, a plurality of functional modules are obtained through virtualization by using software, and each functional module has a function of the TPM chip, so as to ensure that the TPM services can be simultaneously provided for the plurality of VMs. The foregoing functional modules implemented through software virtualization are referred to as virtual trusted platform module (vTPM) chips, or vTPMs for short.

However, because the vTPM chip is obtained through software virtualization, compared with the TPM chip in a hardware form, the vTPM chip has poorer security, and consequently cannot ensure data security.

SUMMARY

The present disclosure provides a vTPM implementation method, to ensure data security while providing TPM services for a plurality of VMs.

A first aspect of the present disclosure provides a vTPM implementation method, and the method is applied to a computer. A vTPM service component runs in a trusted execution environment of the computer, and a first VM and a vTPM proxy component run in a rich execution environment of the computer. The method includes: A vTPM service component obtains first request information from the vTPM proxy component, where the first request information includes an identifier of the first VM, and the first request information is used to request to perform a TPM operation. For example, the vTPM service component obtains the first request information transferred by a TrustZone driver component in a monitor mode. For example, the first request information is used to request to perform the TPM operation such as generating a key, encrypting data, or decrypting data. The vTPM service component can determine, based on the identifier of the first VM in the first request information, a first storage space corresponding to the identifier of the first VM. The vTPM service component processes the first request information based on data in the first storage space, where the first storage space is a storage space corresponding to the identifier of the first VM in the trusted execution environment, and the first storage space is used to store TPM data of the first VM.

In this solution, the vTPM service component running in the trusted execution environment determines the corresponding storage space based on the identifier of the VM in the obtained request information, and provides, based on the data in the storage space corresponding to the identifier of the VM, a TPM service for the VM corresponding to the identifier of the VM in the request information, so that the vTPM service component can provide TPM services for different VMs based on different storage spaces. Therefore, security of data in the vTPM can be ensured by providing the TPM services for the plurality of VMs.

Optionally, in an implementation, the trusted execution environment of the computer further includes a second storage space, where the second storage space is used to store TPM data of a second VM in the computer, and the first storage space and the second storage space are storage spaces that do not overlap each other. In other words, the trusted execution environment of the computer includes a plurality of mutually isolated storage spaces, and different storage spaces are used to store TPM data of different VMs, so that the vTPM service component can provide a TPM service for each VM based on TPM data in the storage space uniquely corresponding to the VM.

Optionally, in an implementation, the first request information further includes a command identifier and a to-be-processed parameter, and the command identifier is used to indicate a type of a to-be-executed TPM operation. That the vTPM service component processes the first request information based on data in the first storage space specifically includes: The vTPM service component processes the to-be-processed parameter based on the command identifier in the first request information and the data in the first storage space, to obtain target data. The vTPM service component transfers the target data to a TrustZone driver component, where a destination party of the target data is the vTPM proxy component.

Optionally, in an implementation, the to-be-processed parameter includes a key handle and to-be-encrypted data. The vTPM service component invokes a command invocation interface function to parse the first request information, to obtain the command identifier and the to-be-processed parameter in the first request information. The vTPM service component encrypts, based on the command identifier obtained through parsing, the to-be-encrypted data by using a key, where the key is determined by the vTPM based on the key handle. For example, the first request information includes the command identifier, the key handle, and the to-be-encrypted data, and the command identifier is used to indicate to perform an RSA encryption operation. The vTPM service component searches, based on the key handle, the first storage space for a key corresponding to the key handle.

Finally, the vTPM service component performs, based on the command identifier, encryption processing on the to-be-encrypted data by using the key obtained from the first storage space, to obtain the target data.

Optionally, in an implementation, the to-be-processed parameter includes a key handle and to-be-decrypted data. The vTPM service component invokes a command invocation interface function to parse the first request information, to obtain the command identifier and the to-be-processed parameter in the first request information. The vTPM service component decrypts the to-be-decrypted data by using a key based on the command identifier, where the key is determined by the vTPM based on the key handle.

Optionally, in an implementation, before that the vTPM service component processes the first request information based on data in the first storage space, the method further includes: If the storage space corresponding to the identifier of the first VM does not exist in the trusted execution environment, the vTPM service component allocates a storage space to the identifier of the first VM in the trusted execution environment. The vTPM service component performs a TPM initialization operation on data in the allocated storage space, so that the data in the allocated storage space is updated to TPM initialization data, and the allocated storage space is used as the first storage space corresponding to the identifier of the first VM. That the vTPM service component performs a TPM initialization operation on data in the storage space includes: The vTPM service component divides the storage space to obtain a plurality of storage blocks, where the plurality of storage blocks are respectively used to store data such as a platform seed, an endorsement seed, a storage seed, a key, or a PCR. The vTPM service component updates the data in the storage block to obtain the TPM initialization data. For example, the vTPM service component updates data in the storage space for storing the PCR, to assign an initialized value to the PCR. The initialized value is an initial value of the PCR.

The vTPM service component allocates, in the trusted execution environment, the corresponding storage space for the identifier of the VM, so that it can be ensured that each VM has the corresponding storage space in the trusted execution environment, and it can be ensured that the vTPM service component can provide TPM services for a plurality of VMs based on TPM data in different storage spaces.

Optionally, in an implementation, that the vTPM service component allocates a storage space to the identifier of the first VM in the trusted execution environment specifically includes: The vTPM service component searches a volatile memory of the computer for the storage space corresponding to the identifier of the first VM. If the storage space corresponding to the identifier of the first VM does not exist in the volatile memory, the vTPM service component allocates, in the volatile memory, the corresponding storage space to the identifier of the first VM.

Optionally, in an implementation, the first request information obtained by the vTPM service component is transmitted in a first session, the first session is used to transmit information used to request to perform a TPM operation and/or the target data between the vTPM service component and the vTPM proxy component, and the target data is data obtained after the vTPM service component performs the TPM operation. The method further includes: after the first VM is started, the vTPM service component obtains second request information from the vTPM proxy component, where the second request information includes the identifier of the first VM, and the second request information is used to request to establish the first session. The vTPM service component establishes a session based on the identifier of the first VM, allocates a storage space in the volatile memory of the computer, and uses the allocated storage space as the first storage space. In other words, after the VM is started, the vTPM service component is triggered, through a session establishment request transferred by the vTPM proxy component, to allocate a storage space to the identifier of the VM. Therefore, before obtaining a TPM operation request, the vTPM proxy component can allocate the corresponding storage space to the identifier of the VM in advance. In this way, efficiency of performing the TPM operation is improved.

Optionally, in an implementation, the first session is a session corresponding to the identifier of the first VM, and the method further includes: The vTPM service component invokes a session open interface (TA_OpenSessionEntry-Point) function based on the identifier of the first VM that is included in the second request information, to establish the first session corresponding to the identifier of the first VM and obtain the identifier of the first session. The vTPM service component transfers the identifier of the first session to the TrustZone Driver component in the rich execution environment of the computer, where a destination party of the identifier of the first session is the vTPM proxy component. In other words, the vTPM service component establishes the first session by invoking the TA_OpenSessionEntryPoint function, and returns the obtained identifier of the first session to the vTPM proxy component.

Optionally, in an implementation, that the vTPM service component allocates the storage space in the volatile memory specifically includes: The vTPM service component searches a non-volatile memory of the computer for the storage space corresponding to the identifier of the first VM.

If the storage space corresponding to the identifier of the first VM exists in the non-volatile memory, the vTPM service component allocates the storage space in the volatile memory, and data in the storage space corresponding to the identifier of the first VM in the non-volatile memory is copied to the allocated storage space. In other words, after allocating the storage space in the volatile memory to the identifier of the first VM, the vTPM service component does not need to perform a TPM initialization operation on the data in the allocated storage space, but copies the data in the storage space that is in the non-volatile memory and that corresponds to the identifier of the first VM to the allocated storage space. In this way, in a first VM restart scenario, the TPM data used by the first VM before the restart may be recovered in the volatile memory, thereby ensuring normal running of the first VM.

If the storage space corresponding to the identifier of the first VM does not exist in the non-volatile memory, it may be considered that the first VM is created for the first time or the TPM data corresponding to the first VM has been discarded. The vTPM service component allocates the storage space in the volatile memory, and performs the TPM initialization operation on the data in the allocated storage space.

Optionally, in an implementation, after that the vTPM service component allocates the storage space in the volatile memory, the method further includes: The vTPM service component marks the allocated storage space based on the identifier of the first VM, so that the vTPM service component can subsequently determine, based on the identifier of the first VM, the storage space corresponding to the vTPM service component.

Optionally, in an implementation, the method further includes: When the first VM is closed, the vTPM service component obtains third request information from the vTPM proxy component. The third request information is transmitted in the first session, the third request information includes the identifier of the first VM, and the third request information is used to request to close the first session. The vTPM service component determines the first storage space based on the identifier of the first VM that is included in the third request information. The vTPM service component copies the data in the first storage space to a third storage space, where the third storage space is located in the non-volatile memory. Optionally, after copying of the data in the storage space in the volatile memory is completed, the vTPM service component discards the data in the storage space in the volatile memory. In this way, the storage space in the volatile memory is recycled and utilization of the storage space in the volatile memory is improved. The TPM data corresponding to the identifier of the first VM is copied to the non-volatile memory when the first VM is closed, so that the TPM data corresponding to the first VM can be recovered when the first VM is restarted, thereby ensuring normal running of the first VM.

Optionally, in an implementation, the first request information is transferred by the TrustZone driver component to the vTPM service component in a monitor mode, and the TrustZone driver component runs in the rich execution environment of the computer.

A second aspect of the present disclosure provides a vTPM implementation method, including: A vTPM proxy component obtains first request information from a first VM, where the first request information is used to request the vTPM service component to perform a TPM operation; the vTPM service component runs in a trusted execution environment of a computer, and the first VM runs in a rich execution environment of the computer. The vTPM proxy component obtains an identifier of the first VM. The vTPM proxy component adds the identifier of the first VM to the first request information, to obtain second request information, where the second request information includes the identifier of the first VM. The vTPM proxy component transfers the second request information to a TrustZone driver component that runs in the trusted execution environment of the computer, where a destination party of the second request information is the vTPM service component. The identifier of the VM is added to the TPM operation request, so that the vTPM service component can determine the corresponding storage space based on the identifier of the VM that is included in a TPM operation request, and provide a TPM service for the VM based on TPM data in the storage space corresponding to the identifier of the VM.

Optionally, in an implementation, that the vTPM proxy component adds the identifier of the first VM to the first request information includes: The vTPM proxy component adds the identifier of the first VM to the first request information by invoking a command invocation function, to obtain the second request information.

Optionally, in an implementation, the method further includes: The vTPM proxy component obtains third request information from a second VM, where the third request information is used to request to perform a TPM operation. The vTPM proxy component obtains an identifier of the second VM. The vTPM proxy component adds the identifier of the second VM to the third request information, to obtain fourth request information, where the fourth request information includes the identifier of the second VM. The vTPM proxy component transfers the fourth request information to the TrustZone driver component, where a destination party of the fourth request information is the vTPM service component.

Optionally, in an implementation, the method further includes: The vTPM proxy component obtains target data from the vTPM service component through the TrustZone driver component, where the target data is data obtained after the vTPM service component performs a TPM operation based on the second request information. The vTPM proxy component transfers the target data to the first VM.

Optionally, in an implementation, the method further includes: When the first VM is started, the vTPM proxy component obtains the identifier of the first VM. The vTPM proxy component generates fifth request information, where the fifth request information is used to request to establish a session with the vTPM service component, and the fifth request information includes the identifier of the first VM. The vTPM proxy component transfers the fifth request information to the TrustZone driver component, where a destination party of the fifth request information is the vTPM service component.

Optionally, in an implementation, the method further includes: The vTPM proxy component obtains sixth request information from the first VM, where the sixth request information is used to request to close the session with the vTPM service component. The vTPM proxy component obtains the identifier of the first VM. The vTPM proxy component adds the identifier of the first VM to the sixth request information, to obtain seventh request information, where the seventh request information includes the identifier of the first VM. The vTPM proxy component transfers the seventh request information to the TrustZone driver component, where a destination party of the seventh request information is the vTPM service component.

A third aspect of the present disclosure provides a computer system. A trusted execution environment and a rich execution environment run on the computer system, a vTPM service component runs in the trusted execution environment, and a first VM and a vTPM proxy component run in the rich execution environment. The vTPM proxy component is configured to: obtain first request information from the first VM, obtain an identifier of the first VM, add the identifier of the first VM to the first request information, to obtain second request information, and transfer the second request information to a TrustZone driver component, where the first request information is used to request the vTPM service component to perform a TPM operation, the second request information includes the identifier of the first VM, and a destination party of the second request information is the vTPM service component. The vTPM service component is configured to: obtain the second request information through the TrustZone driver component, and process the second request information based on data in a first storage space, where the first storage space is a storage space corresponding to the identifier of the first VM in the trusted execution environment, and the first storage space is used to store TPM data of the first VM.

Optionally, in an implementation, the trusted execution environment further includes a second storage space, where the second storage space is used to store TPM data of a second VM, and the first storage space and the second storage space are storage spaces that do not overlap each other.

Optionally, in an implementation, the second request information further includes a command identifier and a to-be-processed parameter, and the command identifier is used to indicate a type of a to-be-executed TPM operation.

The vTPM service component is further configured to: process the to-be-processed parameter based on the command identifier in the second request information and the data in the first storage space to obtain target data, and transfer the target data to the TrustZone driver component, where a destination party of the target data is the vTPM proxy component. The vTPM proxy component is further configured to: obtain the target data, and transfer the target data to the first VM.

Optionally, in an implementation, the to-be-processed parameter includes a key handle and to-be-encrypted data. The vTPM service component is further configured to invoke a command invocation interface function, to obtain the command identifier and the to-be-processed parameter in the second request information. The vTPM service component is further configured to encrypt the to-be-encrypted data by using a key based on the command identifier, where the key is determined by the vTPM based on the key handle.

Optionally, in an implementation, the to-be-processed parameter includes a key handle and to-be-decrypted data. The vTPM service component is further configured to invoke a command invocation interface function, to obtain the command identifier and the to-be-processed parameter in the second request information. The vTPM service component is further configured to decrypt the to-be-decrypted data by using a key based on the command identifier, where the key is determined by the vTPM based on the key handle.

Optionally, in an implementation, the vTPM proxy component is further configured to obtain third request information from the second VM, where the third request information is used to request to perform the TPM operation. The vTPM proxy component is further configured to: obtain an identifier of the second VM, and add the identifier of the second VM to the third request information, to obtain fourth request information, where the fourth request information includes the identifier of the second VM. The vTPM proxy component is further configured to transfer the fourth request information to the TrustZone driver component, where a destination party of the fourth request information is the vTPM service component. The vTPM service component is configured to: obtain the fourth request information through the TrustZone driver component, and process the fourth request information based on the data in the second storage space, where the second storage space is a storage space corresponding to the identifier of the second VM in the trusted execution environment, and the second storage space is used to store the TPM data of the second VM.

Optionally, in an implementation, if the storage space corresponding to the identifier of the first VM does not exist in the trusted execution environment, the vTPM service component is further configured to: allocate a storage space to the identifier of the first VM in the trusted execution environment, and perform a TPM initialization operation on the data in the allocated storage space, so that the data in the allocated storage space is updated to the TPM initialization data, and the allocated storage space is used as the first storage space.

Optionally, in an implementation, the vTPM service component is further configured to: search a volatile memory of the computer for the storage space corresponding to the identifier of the first VM, and if the storage space corresponding to the identifier of the first VM does not exist in the volatile memory, allocate a storage space in the volatile memory.

Optionally, in an implementation, the second request information is transmitted in a first session, the first session is used to transmit information used to request to perform a TPM operation and/or the target data between the vTPM service component and the vTPM proxy component, and the target data is data obtained after the TPM operation is performed. The vTPM proxy component is further configured to: when the first VM is started, obtain the identifier of the first VM; generate fifth request information, where the fifth request information includes the identifier of the first VM; and transfer the fifth request information to the TrustZone driver component, where the fifth request information is used to request to establish the first session, and a destination party of the fifth request information is the vTPM service component. The vTPM service component is further configured to obtain the fifth request information through the TrustZone driver component, where the vTPM service component allocates a storage space in the volatile memory of the computer, and uses the allocated storage space as the first storage space.

Optionally, in an implementation, the first session is a session corresponding to the identifier of the first VM, and the vTPM service component is further configured to invoke a session open interface function based on the identifier of the first VM that is included in the fifth request information, to establish the first session corresponding to the identifier of the first VM and obtain an identifier of the first session. The vTPM service component is further configured to transfer the identifier of the first session to the TrustZone driver component, where a destination party of the identifier of the first session is the vTPM proxy component.

Optionally, in an implementation, the vTPM proxy component is further configured to: obtain sixth request information from the first VM, where the sixth request information is used to request to close the first session, obtain the identifier of the first VM, add the identifier of the first VM to the sixth request information, to obtain seventh request information, where the seventh request information includes the identifier of the first VM, and transfer the seventh request information to the TrustZone driver component, where a destination party of the seventh request information is the vTPM service component. The vTPM service component is further configured to: obtain the sixth request information, determine the first storage space based on the identifier of the first VM that is included in the sixth request information, and copy the data in the first storage space to a third storage space, where the third storage space is located in the non-volatile memory.

Optionally, in an implementation, the second request information is transferred by the TrustZone driver component to the vTPM service component in a monitor mode, and the TrustZone driver component runs in the rich execution environment of the computer.

A fourth aspect of the present disclosure provides a computer. The computer includes a processor, a non-volatile memory, and a volatile memory. The non-volatile memory or the volatile memory stores computer-readable instructions. The processor reads the computer-readable instructions, so that the computer implements the method according to any one of the implementations of the first aspect or the second aspect.

A fifth aspect of the present disclosure provides a computer-readable storage medium, where the computer-readable storage medium stores a computer program, and when the computer program is run on a computer, the computer is enabled to perform the method according to any one of the implementations of the first aspect or the second aspect.

A sixth aspect of the present disclosure provides a computer program product. When the computer program product is run on a computer, the computer is enabled to perform the method according to any one of the implementations of the first aspect or the second aspect.

A seventh aspect of the present disclosure provides a chip, including one or more processors. Some or all of the processors are configured to read and execute a computer program stored in a memory, to perform the method according to any possible implementation of any one of the foregoing aspects. Optionally, the chip further includes the memory, and the memory and the processor are connected to the memory through a circuit or a wire. Optionally, the chip further includes a communications interface, and the processor is connected to the communications interface. The communications interface is configured to receive data and/or information that need/needs to be processed. The processor obtains the data and/or information from the communications interface, processes the data and/or information, and outputs a processing result through the communications interface. Optionally, the communications interface is an input/output interface. The method provided in the present disclosure is implemented by one chip, or is cooperatively implemented by a plurality of chips.

BRIEF DESCRIPTION OF DRAWINGS

FIG. 1 is a schematic diagram of a structure of a TPM according to an embodiment of the present disclosure;

DESCRIPTION OF EMBODIMENTS

Figure 2:
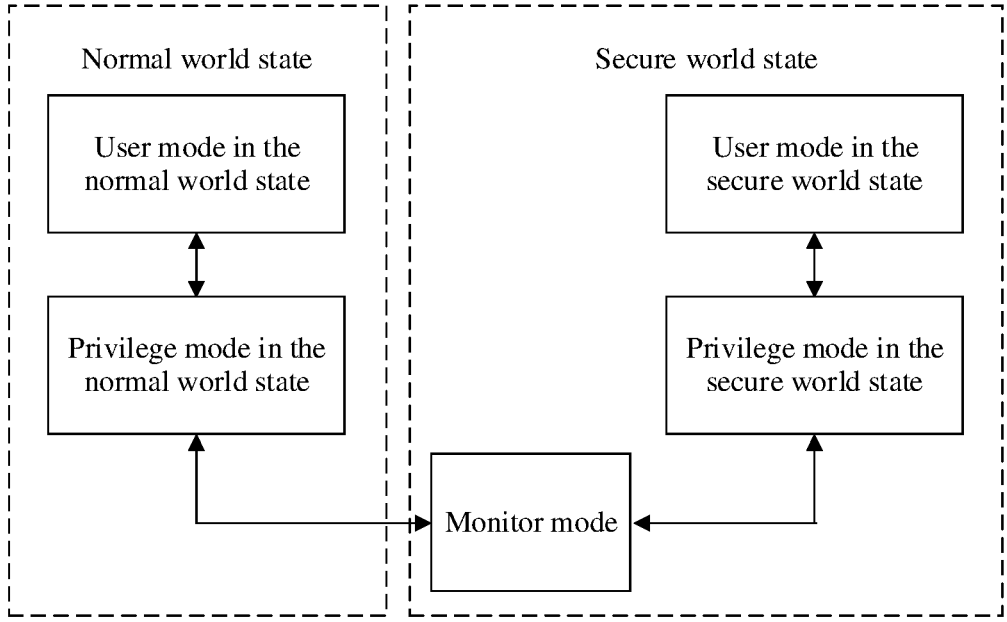
FIG. 2 is a schematic diagram of a system software layer related to a TrustZone technology according to an embodiment of the present disclosure.

To make objectives, technical solutions, and advantages of the present disclosure clearer, the following describes embodiments of the present disclosure with reference to the accompanying drawings. It is clear that the described embodiments are merely some but not all of embodiments of the present disclosure. A person of ordinary skill in the art may learn that, as a new application scenario emerges, the technical solutions provided in embodiments of the present disclosure are also applicable to a similar technical problem.

In the specification, claims, and accompanying drawings of the present disclosure, the terms "first", "second", and so on are intended to distinguish between similar objects but do not necessarily indicate a specific order or sequence.

The TPM chip is a small chip system including a cryptographic operation component and a storage component, and is configured to securely store information used to verify security of a platform (for example, a network device such as a personal computer), for example, information such as a password, a certificate, or an encryption key. The TPM chip uses built-in algorithms to generate a trusted key, and uses a non-volatile random access memory (NVRAM) and a storage root key (SRK) to ensure confidentiality and integrity of a root key and other sensitive data.

FIG. 1 is a schematic diagram of a structure of a TPM chip according to an embodiment of the present disclosure. As shown in FIG. 1, the TPM chip usually includes but is not limited to the following modules: a key generator, an asymmetric key engine, a symmetric key engine, a hash engine, a random number generator, an authorization module, a non-volatile memory, and a volatile memory. Descriptions of the foregoing modules may be shown below.

The key generator is configured to generate a key within a hardware boundary of the TPM chip and protect security of the key.

The asymmetric key engine is configured to encrypt and decrypt an asymmetric key.

The symmetric key engine is configured to encrypt and decrypt a symmetric key.

The hash engine is configured to perform a secure hash operation on input data and output digest information.

The random number generator is a true random number generator implemented based on hardware.

The authorization module is configured to control access to an entity in the TPM chip, and provide access security assurance for the TPM chip when the TPM chip is accessed.

The non-volatile memory is a memory that is not volatile upon a power failure, and may store data that needs to be permanently stored, such as a key, a random number seed, or a certificate.

The volatile memory is a memory that is volatile upon a power failure, and may store temporary data such as a running session or data in a platform configuration register (PCR).

Because the TPM chip has simple logic, the TPM chip cannot support a virtualization feature, that is, cannot simultaneously provide TPM services for a plurality of VMs. Consequently, the TPM chip cannot be widely applied in some cloud scenarios. The VM is a tightly isolated software container that includes an operating system and an application, and each VM is completely independent. The plurality of VMs can run based on hardware resources of a physical server through a virtualization technology. In a related technology, a plurality of functional modules are obtained through virtualization by using software, and each functional module has a function of the TPM chip, so as to ensure that the TPM services can be simultaneously provided for the plurality of VMs. The foregoing functional modules implemented through software virtualization are referred to as vTPM chips, or vTPMs for short. However, because the vTPM chip is obtained through software virtualization, compared with the TPM chip in a hardware form, the vTPM chip has poorer security, and consequently cannot ensure data security.

In view of this, an embodiment of the present disclosure provides a vTPM implementation method. A vTPM service component running in a trusted execution environment determines a corresponding storage space based on an identifier of a VM, and provides a TPM service for the VM based on data in the storage space corresponding to the VM, so that the vTPM service component can provide TPM services for different VMs based on different storage spaces. Therefore, security of data in the vTPM can be ensured by providing the TPM services for the plurality of VMs.

For ease of understanding, the following describes some technical terms used in embodiments of the present disclosure.

In a related technology, to provide a secure running environment for an application or a component in a computer, a TrustZone technology is introduced to an ARM processor. During running, the ARM processor that supports the TrustZone technology classifies working states into two types: a secure state and an insecure state, which are also referred to as a secure world state and a normal world state. A common operating system and most applications run in the normal world state. Compared with the secure world state, the normal world state has richer development resources. Therefore, the normal world state is usually referred to as a rich execution environment (REE). A trusted operating system runs in the secure world state, and the secure world state is usually referred to as the trusted execution environment (TEE).

When being in the secure state, the processor can run only code on the trusted execution environment side, and has access permission to an address space on the rich execution environment side. When being in the insecure state, the processor can run only code on the rich execution environment side, and obtains specific data on the trusted execution environment side and invokes a specific function only by using a predefined client interface.

FIG. 2 is a schematic diagram of a system software layer related to a TrustZone technology according to an embodiment of the present disclosure. As shown in FIG. 2, a processor has different execution levels (EL) during running. A user mode is represented by EL0. A privilege mode is represented by EL1. A Hyp mode is represented by EL2 and is used to implement a virtualization technology. A monitor mode is represented by EL3. A system can switch between a secure state and an insecure state only when the system is in the monitor mode.

Figure 3:
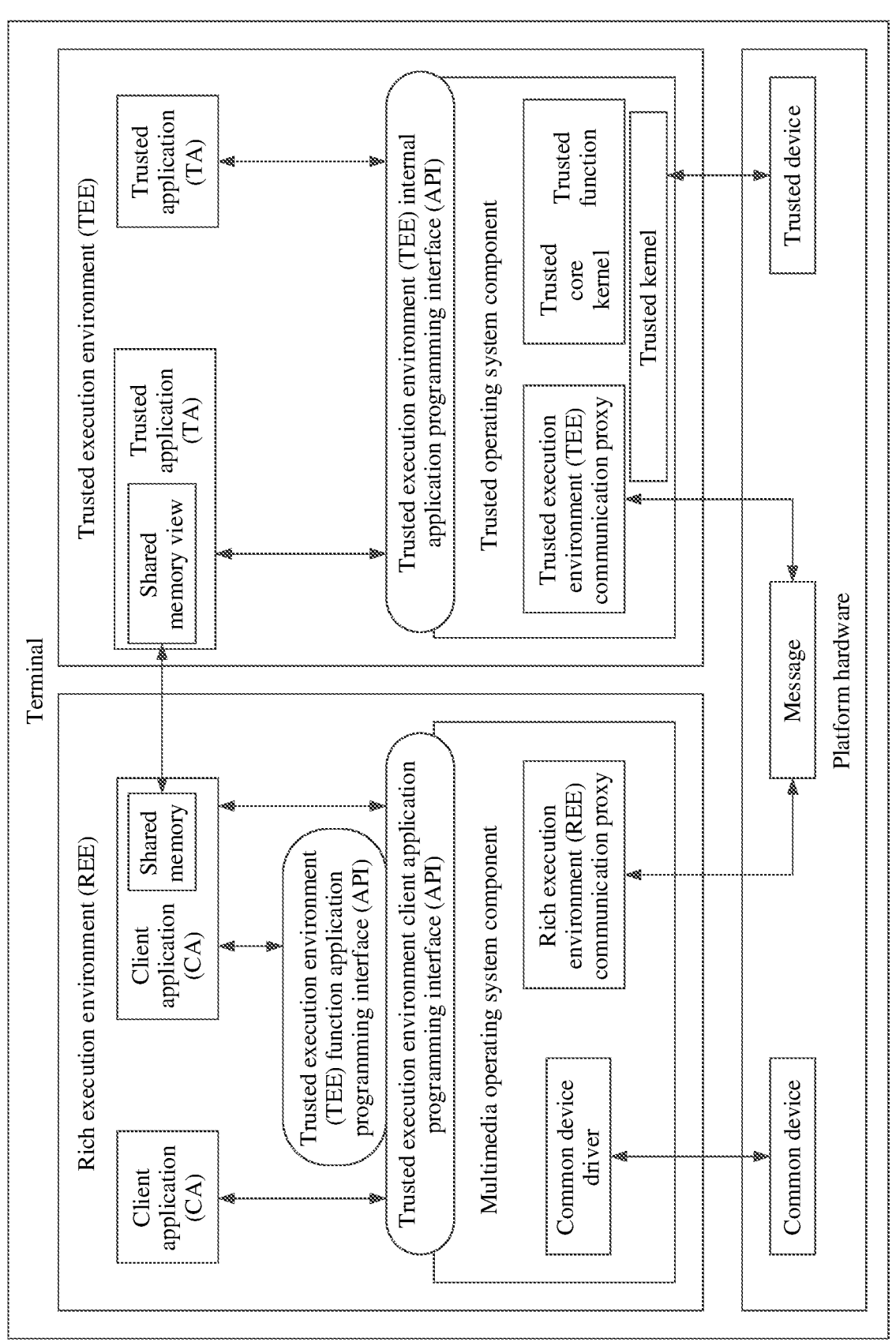
FIG. 3 is a schematic diagram of a system architecture according to an embodiment of the present disclosure.

FIG. 3 is a schematic diagram of a system architecture according to an embodiment of the present disclosure. As shown in FIG. 3, the system architecture includes a trusted execution environment and a rich execution environment. The trusted execution environment is specially provided for a highly security-sensitive application, and can ensure confidentiality and integrity of a resource and data of the application. The general-purpose rich execution environment is provided for a conventional operating system and a general application. An application executed on the rich execution environment side is referred to as a client application (CA), for example, a third-party payment application such as a bank application. An application executed on the trusted execution environment side is referred to as a trusted application (TA), for example, an application that executes a mission-critical service such as signature and encryption/decryption calculation.

Because the TA runs in the trusted execution environment, a deployment/upgrade operation of the TA needs to strictly comply with a security verification specification of an issuer of the trusted execution environment, for example, using a digital signature, to ensure that each phase of the trusted execution environment is truly trusted. The trusted execution environment includes a trusted execution environment internal application programming interface (TEE Internal API) and a trusted operating system component. Main functions of the TEE Internal API are as follows: a function of providing a trusted operating system component upward, communicating with a client application (CA), implementing communication between TAs, and a function of providing such as secure storage, cryptography, and time. The trusted operating system component mainly includes a trusted core framework, a trusted function, a trusted kernel, and a trusted execution environment (TEE) communication proxy. The trusted core framework has a function of providing a system that is similar to an operating system for the TA. The trusted function provides a support capability for an application developer. The trusted kernel is configured to interact with a trusted device in platform hardware. The trusted execution environment communication proxy provides a secure communication channel for the TA and the CA. For example, the trusted execution environment communication proxy transfers a message to a rich execution environment communication proxy by using the platform hardware, to implement interaction between the TA and the CA.

The rich execution environment includes a trusted execution environment client application programming interface (TEE Client API), a trusted execution environment functional application programming interface (TEE Functional API), and a multimedia operating system. The multimedia operating system component mainly includes a public device driver and the rich execution environment communication proxy. The rich execution environment communication proxy is configured to communicate with the trusted execution environment, to provide a secure communication channel for the CA and the TA. The common device driver is used to drive a common device in the platform hardware. By using the TEE client API and the TEE functional API, the CA accesses a security service provided by the TA.

The foregoing describes some technical terms used in the embodiments of the present disclosure. The following describes a computer system and a vTPM implementation method provided in the embodiments of the present disclosure.

Figure 4:
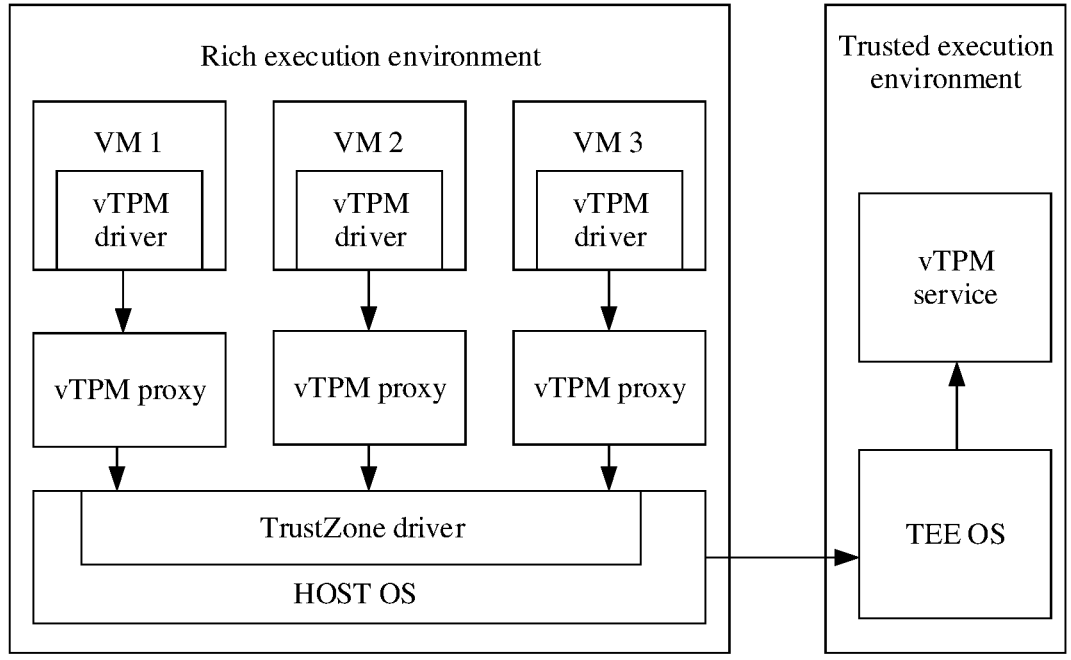
FIG. 4 is a schematic diagram of a structure of a computer system according to an embodiment of the present disclosure.

FIG. 4 is a schematic diagram of a structure of a computer system according to an embodiment of the present disclosure. As shown in FIG. 4, the computer system includes a rich execution environment and a trusted execution environment. A VM, a vTPM driver component, a vTPM proxy component, a TrustZone driver component, and a host operating system (HOST OS) run in the rich execution environment. Optionally, one or more VMs run in the rich execution environment, each VM runs one vTPM driver component, and the vTPM driver component in each VM communicates with a vTPM proxy component corresponding to the VM. Alternatively, each VM runs one vTPM driver component, only one vTPM proxy component runs in the rich execution environment, and the vTPM proxy component communicates with a plurality of vTPM driver components. A trusted execution environment operating system (TEE OS) and a vTPM service component run in the trusted execution environment. A component is a self-contained, programmable, reusable, and language-independent software unit. The vTPM driver component, the vTPM proxy component, and the TrustZone driver component are all software units.

Figure 5:
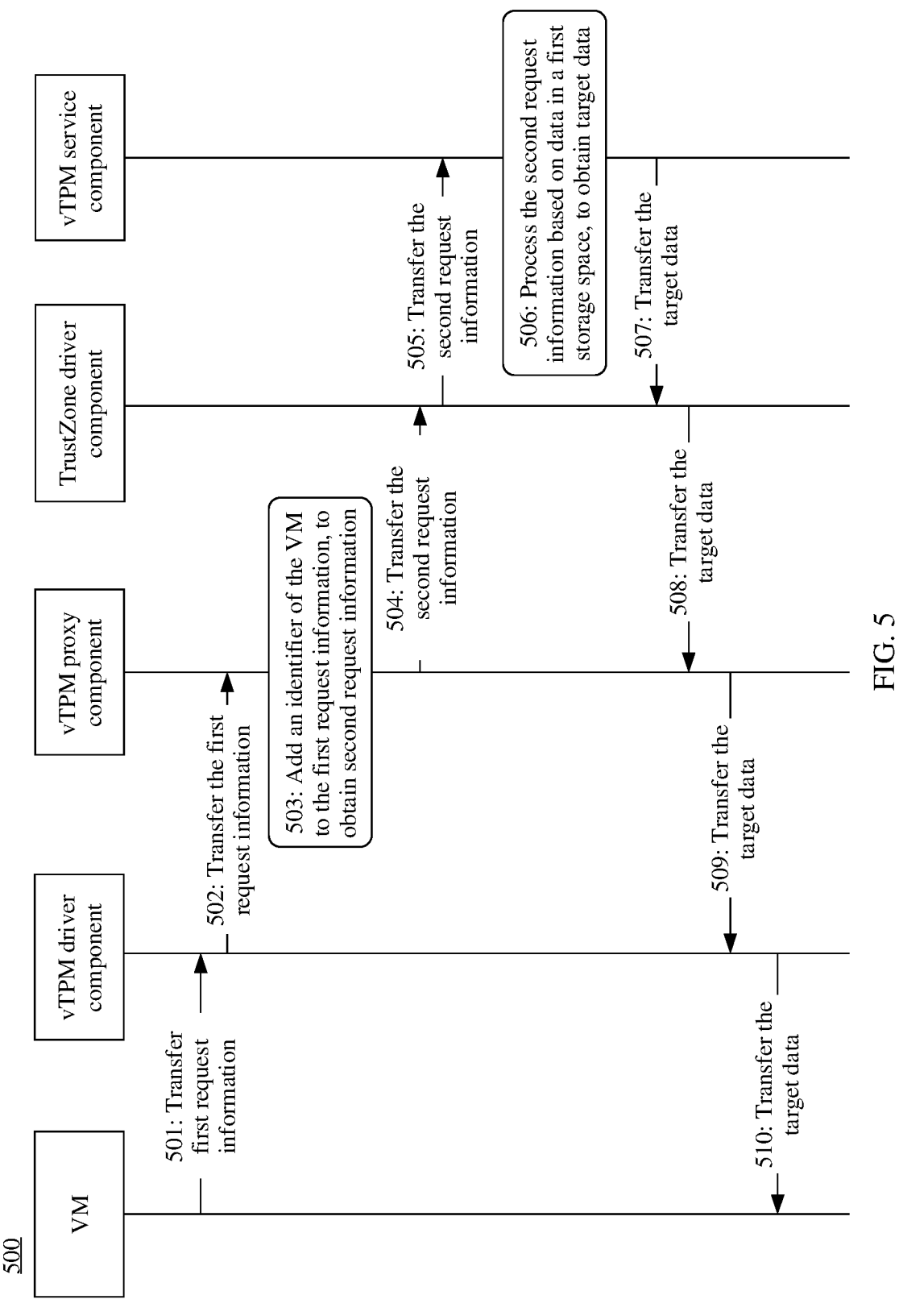
FIG. 5 is a schematic flowchart of a vTPM implementation method 500 according to an embodiment of the present disclosure.

Based on the computer system shown in FIG. 4, an embodiment of the present disclosure provides a vTPM implementation method, as shown in FIG. 5. FIG. 5 is a schematic flowchart of a vTPM implementation method 500 according to an embodiment of the present disclosure. As shown in FIG. 5, the method 500 includes the following step 501 to step 510.

Step 501: A VM transfers first request information to a vTPM driver component, where a destination party of the first request information is a vTPM service component.

In this embodiment, an application (APP) runs in the VM. The app is, for example, a key management component or a payment component. In a running process of the app, the app needs to access the vTPM service component, to request the vTPM service component to perform a TPM operation such as encrypting data or decrypting data. When the app needs to access the vTPM, the VM generates the first request information used to request the vTPM service component to perform the TPM operation, and transfers the first request information to the vTPM driver component. The destination party of the first request information is the vTPM service component.

Optionally, the TPM operation that the first request information is used to request to perform includes but is not limited to an operation such as generating a key, encrypting data, decrypting data, or performing a hash operation on data. The TPM operation that the first request information requests to perform is not specifically limited in this embodiment of the present disclosure.

In a possible example, when the app needs to request the vTPM service component to generate a key, so that the app can subsequently encrypt or decrypt data based on the generated key, the VM invokes a key generation function, and inputs a parameter such as a type of the key that needs to be generated. The key generation function combines the parameter input by the VM into a TPM command byte stream. The TPM command byte stream includes a first command identifier, and the first command identifier is used to indicate to perform a key generation operation.

In another possible example, when the app needs to request the vTPM service component to encrypt data by using an RSA algorithm, the VM invokes an RSA encryption (Tss2_Sys_RSA_Encrypt) function, and inputs parameters such as a command identifier of an encryption operation and data that needs to be encrypted. The RSA algorithm is an asymmetric encryption algorithm. The Tss2_Sys_RSA_Encrypt function combines the parameters input by the VM into a TPM command byte stream, and the TPM command byte stream includes a second command identifier, a first key handle, and to-be-encrypted data. The second command identifier is used to indicate to perform an RSA encryption operation. The first key handle is a key identifier and is used to indicate a key for performing data encryption. The to-be-encrypted data is the data that needs to be encrypted.

In still another possible example, when the app needs to request the vTPM service component to decrypt data by using an RSA algorithm, the VM invokes an RSA decryption function, and inputs parameters such as a command identifier of a decryption operation and data that needs to be decrypted. The RSA decryption function combines the parameters input by the VM into a TPM command byte stream, and the TPM command byte stream includes a third command identifier, a second key handle, and to-be-decrypted data. The third command identifier is used to indicate to perform an RSA decryption operation. The second key handle is a key identifier and is used to indicate a key used to perform data decryption. The to-be-decrypted data is the data that needs to be decrypted.

It may be understood that the TPM command byte stream in the foregoing example is the first request information. After obtaining the TPM command byte stream, the VM transfers the TPM command byte stream to the vTPM driver component by invoking a write function.

Optionally, an expression manner of the first request information is {TPM command identifier (CMD ID), parameters}. The TPM CMD ID is used to identify a specific TPM operation type, for example, data encryption or data decryption. The parameters are used to identify to-be-processed parameters, for example, a to-be-encrypted plaintext or a to-be-decrypted ciphertext.

Step 502: The vTPM driver component transfers the first request information to the vTPM proxy component.

The vTPM driver component is configured to implement an input/output (I/O) operation of TPM data related to the VM. To be specific, the vTPM driver component is responsible for transferring TPM request information generated by the VM to a component outside the VM, and transferring TPM response information returned by the component outside the VM to the VM.

Optionally, the VM runs a guest operating system (guest OS). The guest OS provides a unified device file for apps running on the VM. The device file means that a device is simulated into a file, so that an app can access the device by using an interface of the file. For example, a device such as a hard disk, an input device, or an output device is simulated into a file. That is, when the app on the VM is running, a read/write operation is performed on the device file provided by the operating system, to implement an operation on the vTPM service component.

For example, if a path of a device file corresponding to the vTPM service component is/dev/tpm0, based on the path of the device file, the VM invokes a write function of the system to perform a write operation on the device file, so as to write the first request information. Because the vTPM driver component is configured to implement a specific I/O operation, after the VM writes the first request information, the vTPM driver component is triggered to transfer the first request information to the vTPM proxy component.

Optionally, a manner in which the vTPM driver component transfers the first request information includes but is not limited to: transferring the first request information to the vTPM proxy component by invoking an application programming interface (API), or transferring the first request information to the vTPM proxy component in an interprocess communication manner. The interprocess communication manner includes but is not limited to a manner such as pipe-based communication, message queue-based communication, shared memory-based communication, or socket-based communication. The manner in which the vTPM driver component transfers the first request information is not specifically limited in this embodiment of the present disclosure.

Step 503: The vTPM proxy component adds the identifier of the VM to the first request information, to obtain second request information.

After obtaining the first request information, the vTPM proxy component obtains the identifier of the VM based on a source of the first request information. Then, the vTPM proxy component adds the obtained identifier of the VM to the first request information, to identify the source of the first request information. Optionally, the identifier of the VM is, for example, a universally unique identifier (UUID). The UUID is a 128-bit value, and is generated through calculation based on data such as a current time, a counter, and a hardware identifier.

Optionally, an expression manner of the second request information is {VM UUID, TPM CMD ID, Parameters}.

The vTPM proxy component obtains the identifier of the VM in a plurality of manners.

When one vTPM proxy component corresponds to only one VM, that is, the vTPM proxy component establishes a connection to only one vTPM driver component, the vTPM proxy component obtains an identifier of the VM from a storage space that stores the identifier of the VM. After a virtual machine monitor (VMM) creates the VM, the VMM allocates a unique identifier to the VM as the identifier of the VM, and transfers the identifier of the VM to the vTPM proxy component. The VMM is also referred to as a hypervisor. The vTPM proxy component stores the obtained identifier of the VM in a specific storage space, where the specific storage space stores the identifier of the only one VM. Because the vTPM proxy component corresponds to only one VM, after obtaining the first request information, the vTPM proxy component can obtain the identifier of the VM from the specific storage space. The identifier of the VM can be used to identify the source of the first request information.

When one vTPM proxy component corresponds to a plurality of VMs, that is, the vTPM proxy component establishes connections to a plurality of vTPM driver components, the vTPM proxy component obtains identifiers of the VMs based on the connections to the vTPM driver components. After the VMM allocates an identifier to a newly created VM and transfers, to the vTPM component, the identifier allocated to the newly created VM, the vTPM proxy component establishes a connection to the vTPM driver component corresponding to the newly created VM, and the vTPM proxy component obtains an identifier of the connection to the vTPM driver component. In addition to storing the obtained identifier of the VM, the vTPM proxy component further stores a mapping relationship between the identifier of the VM and the identifier of the connection. In this way, after the vTPM proxy component obtains the first request information, the vTPM proxy component determines an identifier of a connection (namely, the identifier of the connection between the vTPM proxy component and the vTPM driver component) based on a connection for transferring the first request information. The connection for transferring the first request information is a connection between the vTPM driver component and the vTPM proxy component, and the connection is used to transfer the first request information. Then, the vTPM proxy component determines the identifier of the VM based on the identifier of the connection and the mapping relationship, to obtain the identifier of the VM corresponding to the first request information.

Step 504: The vTPM proxy component transfers second request information to the TrustZone driver component, where a destination party of the second request information is the vTPM service component.

Because the vTPM proxy component is located in a rich execution environment, and the vTPM service component is located in a trusted execution environment, the vTPM proxy component cannot directly transfer the second request information to the vTPM service component. Therefore, the vTPM proxy component implements information transfer between the vTPM proxy component and the vTPM service component through the TrustZone driver component.

Specifically, the vTPM proxy component transfers the second request information to the TrustZone driver component, and the TrustZone driver component transfers the second request information to the vTPM service component.

Optionally, the vTPM proxy component transfers the second request information to the TrustZone driver component by invoking a command invocation (TEEC_InvokeCommand) function.

Step 505: The TrustZone driver component transfers the second request information to the vTPM service component.

After obtaining the second request information, the TrustZone driver component parses the second request information, and re-integrates the second request information, so that a format of the integrated second request information is a format that can be identified by the vTPM service component. The TrustZone driver component loads the integrated second request information into a shared memory, and triggers a security monitor call (SMC) to enter a monitor mode. After the TrustZone driver component enters the monitor mode, the TrustZone driver component transfers an instruction to the vTPM service component, so that the vTPM service component can obtain the second request information from the shared memory based on the instruction, thereby implementing transfer of the second request information.

Step 506: The vTPM service component processes the second request information based on data in a first storage space, to obtain target data.

In this embodiment, the vTPM service component allocates an independent storage space to each VM, and different storage spaces do not overlap each other. The vTPM service component can uniquely determine, based on the obtained identifier of the VM, the storage space corresponding to the identifier of the VM. For example, the vTPM service component allocates the first storage space to the VM, and allocates a second storage space to another VM. Therefore, based on the identifier of the VM that is included in the second request information, the vTPM service component can determine the first storage space corresponding to the identifier of the VM. The first storage space is located in the trusted execution environment, and the first storage space is used to store TPM data of the VM. In this way, the vTPM service component processes the second request information based on the data in the first storage space.

Optionally, after obtaining the second request information, the vTPM service component processes the second request information by invoking a command invoke interface (TA_InvokeCommandEntryPoint) function. Specifically, the vTPM service component invokes the TA_InvokeCommandEntryPoint function to parse the second request information, to obtain the identifier of the VM in the second request information and the TPM command byte stream. Then, the vTPM service component searches for a storage space corresponding to the identifier of the VM, determines to obtain the first storage space, and processes the TPM command byte stream based on the data in the first storage space.

In a possible example, the TPM command byte stream includes a first command identifier, and the first command identifier is used to indicate to perform a key generation operation. The vTPM service component obtains a root key from the first storage space based on the first command identifier, and generates a key based on the root key. After generating the key, the vTPM service component stores the key in the first storage space, and generates a key handle corresponding to the key, to obtain the target data. The key handle is an identifier, and is used to identify the key.

In another possible example, the TPM command byte stream includes a second command identifier, a first key handle, and to-be-encrypted data, and the second command identifier is used to indicate to perform an RSA encryption operation. The vTPM service component searches the first storage space for a key corresponding to the first key handle based on the first key handle in the TPM command byte stream. Finally, the vTPM service component performs, based on the second command identifier in the TPM command byte stream, encryption processing on the to-be-encrypted data by using the key obtained from the first storage space, to obtain the target data.

In still another possible example, the TPM command byte stream includes a third command identifier, a second key handle, and to-be-decrypted data, and the third command identifier is used to indicate to perform an RSA decryption operation. The vTPM service component searches the first storage space for a key corresponding to the second key handle based on the second key handle in the TPM command byte stream. Finally, the vTPM service component performs, based on the third command identifier in the TPM command byte stream, decryption processing on the to-be-decrypted data by using the key obtained from the first storage space, to obtain the target data.

Optionally, the data obtained after the vTPM service component performs the TPM operation based on the second request information needs to be returned to the VM that transfers the second request information, namely, the VM represented by the identifier of the VM that is included in the second request information. Therefore, after performing the TPM operation (for example, the key generation operation, the RSA encryption operation, or the RSA decryption operation) and obtaining the corresponding TPM data, the vTPM service component further adds the identifier of the VM that is included in the second request information to the obtained TPM data, to obtain the target data that further includes the identifier of the VM that is included in the second request information. In a process of transferring the target data, another subsequent component can determine, based on the identifier of the VM that is included in the target data, to transfer the target data to the VM represented by the identifier of the VM that is included in the target data.

Step 507: The vTPM service component transfers the target data to the TrustZone driver component, where a destination party of the target data is the vTPM proxy component.

After obtaining the target data, the vTPM service component loads the target data to the shared memory and sends an instruction to the TrustZone driver component. In this way, the TrustZone driver component can obtain the target data from the shared memory based on the obtained instruction, thereby implementing transfer of the target data.

Step 508: The TrustZone driver component transfers the target data to the vTPM proxy component.

Optionally, after obtaining the target data, the TrustZone driver component transfers the target data to the vTPM proxy component by invoking the command invoke (TEEC_InvokeCommand) function.

Step 509: The vTPM proxy component transfers the target data to the vTPM driver component.

Optionally, the vTPM proxy component transfers the target data to the vTPM proxy component by invoking the command invoke (TEEC_InvokeCommand) function, or the vTPM proxy component transfers the target data to the vTPM proxy component by sending an answer message carrying the target data.

Optionally, when the vTPM proxy component is connected to the plurality of vTPM driver components, the vTPM proxy component obtains the identifier of the VM that is included in the target data, and determines, based on the obtained identifier of the VM, how to transfer the target data. Because the vTPM proxy component stores the mapping relationship between the identifier of the VM and the identifier of the connection (namely, the identifier of the connection between the vTPM proxy component and the vTPM driver component), the vTPM proxy component can determine, based on the mapping relationship, the identifier of the connection that corresponds to the identifier of the VM. Based on the determined identifier of the connection, the vTPM proxy component can determine the connection to the vTPM driver component. The vTPM proxy component transfers the target data by using the determined connection to the vTPM driver component, to transfer the target data to the vTPM driver component corresponding to the identifier of the VM.

Step 510: The vTPM driver component transfers the target data to the VM.

After the vTPM driver component obtains the target data, the app in the VM can read, by invoking a read function, the target data returned by the vTPM driver component, thereby implementing transfer of the target data.

It can be learned from the description of the foregoing embodiment that the vTPM service component running in the trusted execution environment allocates different storage spaces to different VMs, and the different storage spaces do not overlap each other. When the vTPM service component obtains the request information used to request to perform the TPM operation, the vTPM service component determines the corresponding storage space based on the identifier of the VM in the request information, and provides, based on the data in the storage space corresponding to the identifier of the VM, the TPM service for the VM represented by the identifier of the VM in the request information, so that the vTPM service component can provide TPM services for the different VMs based on the different storage spaces. Therefore, data security can be ensured by providing the TPM services for the plurality of VMs.

The foregoing describes a process in which the vTPM service component determines the corresponding storage space based on the identifier of the VM and performs the TPM operation. The following describes a process in which the vTPM service component allocates the storage space to the VM.

A manner of triggering the vTPM service component to allocate the storage space to the VM includes but is not limited to the following two manners.

Manner 1: After the VM is created, the vTPM proxy component corresponding to the VM transfers, to the vTPM service component, request information used to request session establishment, to trigger the vTPM service component to allocate a storage space to the VM. In other words, the vTPM service component is triggered, through the request information used to request to establish the session, to allocate the storage space to the VM.

Manner 2: After the VM is created, the VM transfers, to the vTPM service component for the first time, request information used to request to perform a TPM operation, where the request information used to request to perform a TPM operation can trigger the vTPM service component to allocate a storage space to the VM. In other words, the vTPM service component is triggered, through the request information that is transferred for the first time and that is used to request to perform the TPM operation, to allocate the storage space to the VM.

For ease of understanding, the following describes the foregoing two manners with reference to the accompanying drawings.

Figure 6:
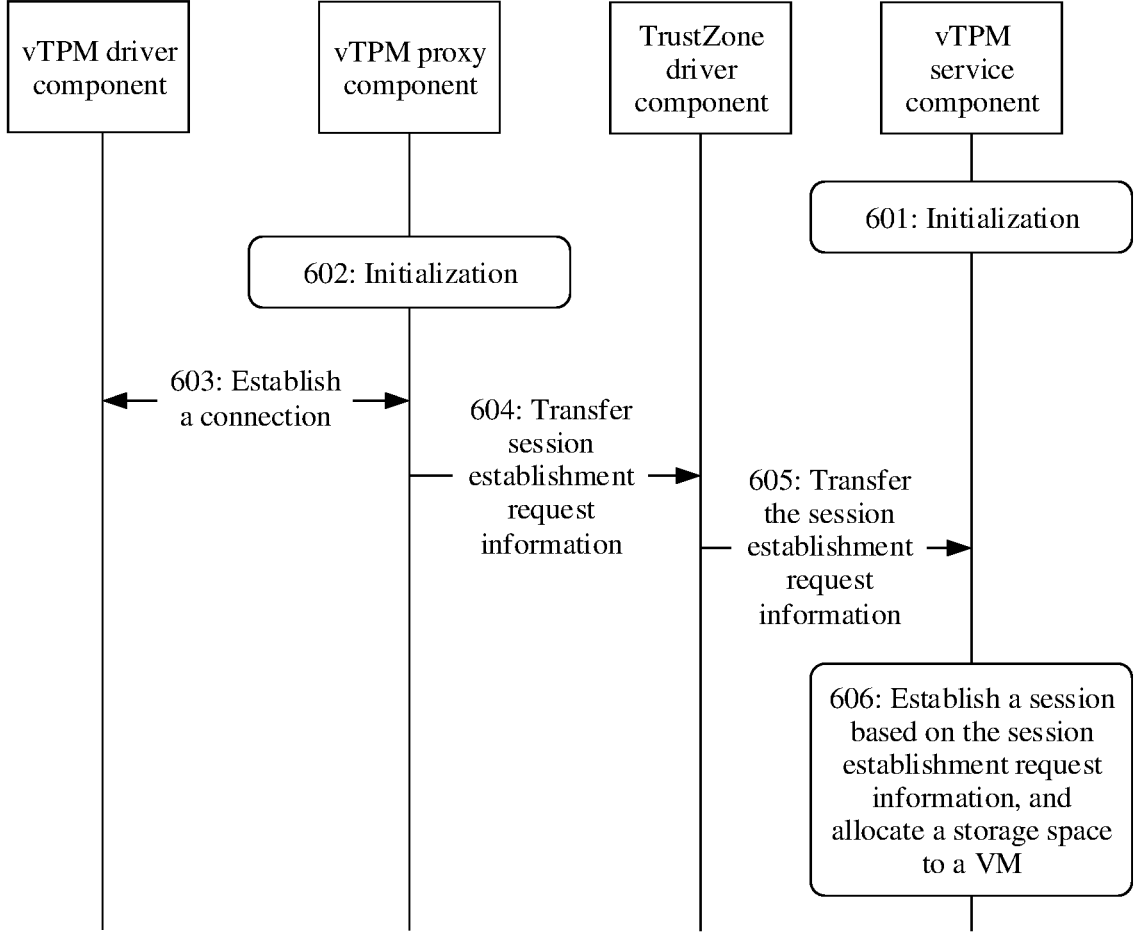
FIG. 6 is a schematic flowchart of a method for allocating a storage space by a vTPM service component according to an embodiment of the present disclosure.

FIG. 6 is a schematic flowchart of a method for allocating a storage space by a vTPM service component according to an embodiment of the present disclosure. The method shown in FIG. 6 corresponds to the foregoing manner 1. As shown in FIG. 6, a process in which the vTPM service component allocates the storage space includes the following step 601 to step 606.

Step 601: Initialize a vTPM service component.

In this embodiment, the vTPM service component is a TA running in a trusted execution environment. In a startup phase of the vTPM service component, secure boot is used to ensure integrity and authenticity of a TA file. Specifically, the TA file of the vTPM service component is signed by a certificate authority (CA) system of a software publisher. During a startup of a physical server, a basic input/output system (BIOS) verifies a file signature of the vTPM service component to ensure authenticity and integrity of the vTPM service component. After the file signature verification of the vTPM service component succeeds, the vTPM service component is loaded to secure memory of the trusted execution environment for initialization and running, to implement initialization of the vTPM service component.

Step 602: Initialize a vTPM proxy component.

When one vTPM proxy component corresponds to only one VM, because the vTPM proxy component belongs to a part of the VMM, when the VMM starts the VM, the VMM also starts the vTPM proxy component corresponding to the VM. In other words, the vTPM proxy component is started together with the VM. After the vTPM proxy component is started, the vTPM proxy component obtains and stores an identifier of the currently started VM that has a correspondence with the vTPM proxy component, to complete an initialization process.

If one vTPM proxy component corresponds to a plurality of VMs, the VMM starts the vTPM proxy component when starting a first VM. After the vTPM proxy component is started, the vTPM proxy component obtains and saves an identifier of the first started VM, to complete the initialization process. Optionally, when the VMM subsequently starts another VM, the vTPM proxy component continues to obtain and store an identifier of a subsequently started VM.

Step 603: The vTPM driver component establishes a connection to the vTPM proxy component.

After the VM is started, the VM loads the vTPM driver component. The vTPM driver component establishes a connection to the vTPM proxy component. When one vTPM proxy component establishes connections to a plurality of vTPM driver components, after one vTPM driver component establishes a connection to the vTPM proxy component, the vTPM proxy component obtains an identifier of the connection, and establishes a mapping relationship between the identifier of the connection and an identifier of a VM on which the vTPM driver component is located. For example, after the first VM is started, a vTPM driver component loaded by the first VM establishes a connection to the vTPM proxy component. It is assumed that a first connection identifier is used to identify a connection established between the vTPM driver component loaded by the first VM and the vTPM proxy component. The vTPM proxy component obtains the first connection identifier, and establishes a mapping relationship between the first connection identifier and the first VM.

Step 604: The vTPM proxy component transfers session establishment request information to a TrustZone driver component, where a destination party of the session establishment request information is the vTPM service component.

Because the VM is started for the first time, and no session is established between the VM proxy component and the vTPM service component, the vTPM proxy component transfers session establishment request information to the TrustZone driver component, where the session establishment request information includes the identifier of the VM. A destination party of the session establishment request information is the vTPM service component, and the session establishment request information is used to request to establish a session. After the session is established between the VM proxy component and the vTPM service component, the session between the VM proxy component and the vTPM service component is used to subsequently transmit various types of information and/or target data between the vTPM service component and the vTPM proxy component. The target data is obtained after the vTPM service component performs the TPM operation.

Optionally, the vTPM proxy component initializes context between the VM and an executable environment by invoking a context initialization (TEEC_InitializeContext) function, to obtain corresponding context (TEEC_context). Then, the vTPM proxy component invokes a session open (TEEC_OpenSession) function, and specifies an identifier of the VM when invoking the TEEC_OpenSession function, to transfer session establishment request information to the TrustZone driver component.

Step 605: The TrustZone driver component transfers the session establishment request information to the vTPM service component.

The TrustZone driver component parses the obtained session establishment request information, and re-integrates the session establishment request information to adjust a format of the session establishment request information. The TrustZone driver component loads the integrated session setup request information to the shared memory and triggers an SMC to enter a monitor mode. After entering the monitor mode, the TrustZone driver component transfers an instruction to the vTPM service component, so that the vTPM service component can obtain the session establishment request information from the shared memory based on the instruction, thereby implementing transfer of the session establishment request information.

Step 606: The vTPM service component establishes a session based on the session establishment request information, and allocates a storage space to the VM.

After obtaining the session establishment request information, the vTPM service component invokes a session open interface (TA_OpenSessionEntryPoint) function. By executing the TA_OpenSessionEntryPoint function, the vTPM service component parses the session establishment request information, and obtains the identifier of the VM that is included in the session establishment request information. The vTPM service component establishes the session based on the identifier of the VM that is included in the session establishment request information, and obtains an identifier of the session corresponding to the identifier of the VM that is included in the session establishment request information. The vTPM service component transfers the identifier of the session to the TrustZone driver component, where a destination party of the identifier of the session is the vTPM proxy component, so that the vTPM proxy component can obtain the identifier of the session corresponding to the identifier of the VM that is included in the session establishment request information.

The vTPM proxy component transfers the session establishment request information to the vTPM service component only when the VM is started for the first time. Therefore, before the vTPM service component obtains the session establishment request information, the vTPM service component does not allocate a storage space to the identifier of the VM that is included in the session establishment request information. Based on this, after obtaining the session establishment request information, the vTPM service component allocates, in the trusted execution environment, a storage space to the identifier of the VM based on the identifier of the VM that is included in the session establishment request information. After the storage space is allocated, the vTPM service component marks the allocated storage space based on the identifier of the VM that is included in the session establishment request information.

After the storage space is allocated to the identifier of the VM that is included in the session establishment request information, to ensure that the vTPM proxy component can subsequently perform a TPM operation based on data in the allocated storage space, the vTPM service component performs a TPM initialization operation on the data in the storage space. The vTPM service component updates the data in the allocated storage space to the TPM initialization data by performing the TPM initialization operation.

For example, that the vTPM service component performs the TPM initialization operation on the data in the storage space includes: The vTPM service component divides the storage space to obtain a plurality of storage blocks, where the plurality of storage blocks are respectively used to store data such as a platform seed, an endorsement seed, a storage seed, a key, or a PCR. The vTPM service component updates the data in the storage block to obtain the TPM initialization data. For example, the vTPM service component updates data in the storage space for storing the PCR, to assign an initialized value to the PCR. The initialized value is an initial value of the PCR.

Optionally, if the VM is started again after being closed, a non-volatile memory in the trusted execution environment may further have a storage space corresponding to the identifier of the VM. Therefore, before the vTPM service component allocates the storage space to the identifier of the VM, the vTPM service component searches the non-volatile memory for the storage space corresponding to the identifier of the VM.

If the storage space corresponding to the identifier of the VM that is included in the session establishment request information exists in the non-volatile memory, the vTPM service component allocates, in the volatile memory, the storage space to the identifier of the VM, and copies data in the storage space corresponding to the identifier of the VM in the non-volatile memory to the allocated storage space. In other words, after allocating the storage space in the volatile memory to the identifier of the VM, the vTPM service component does not need to perform the TPM initialization operation on the data in the storage space, but copies the data in the storage space corresponding to the identifier of the VM in the non-volatile memory to the allocated storage space. In this way, in a VM restart scenario, TPM data used by the VM before the restart can be recovered in the volatile memory, thereby ensuring normal running of the VM.

If the storage space corresponding to the identifier of the VM that is included in the session establishment request information does not exist in the non-volatile memory, it is considered that the VM corresponding to the identifier of the VM that is included in the session establishment request information is created for the first time or the TPM data of the the VM corresponding to the identifier of the VM that is included in the session establishment request information is discarded. The vTPM service component allocates the storage space in the volatile memory to the identifier of the VM, and performs a TPM initialization operation on the data in the allocated storage space.

Figure 7:
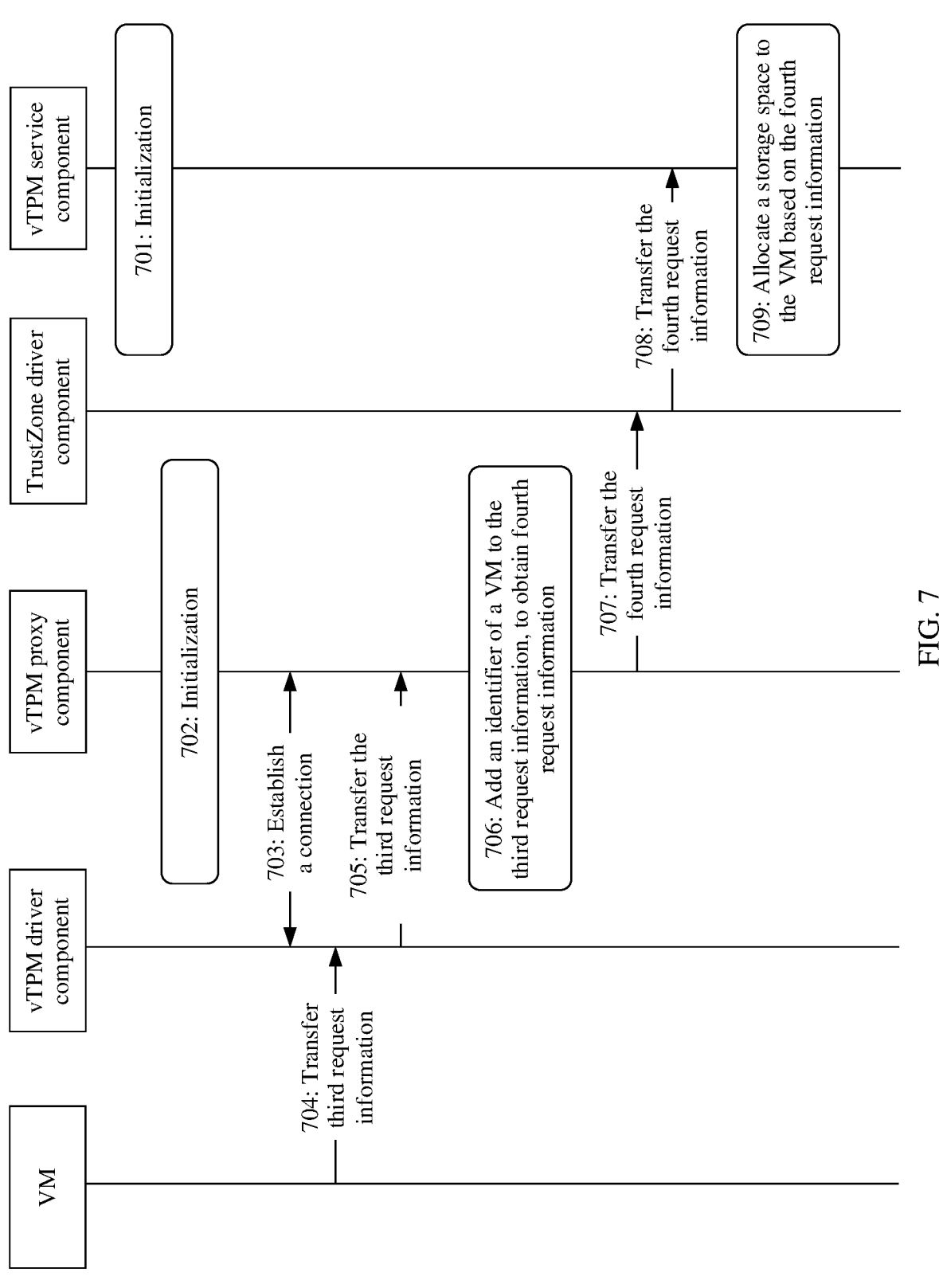
FIG. 7 is a schematic flowchart of another method for allocating a storage space by a vTPM service component according to an embodiment of the present disclosure.

FIG. 7 is a schematic flowchart of another method for allocating a storage space by a vTPM service component according to an embodiment of the present disclosure. The method shown in FIG. 7 corresponds to the foregoing manner 2. As shown in FIG. 7, a process in which the vTPM service component allocates a storage space includes the following steps.

Step 701: Initialize a vTPM service component.

Step 702: Initialize a vTPM proxy component.

Step 703: The vTPM proxy component establishes a connection to a vTPM driver component.

In this embodiment, steps 701 to 703 are similar to the foregoing steps 601 to 603. For details, refer to the foregoing steps 601 to 603. Details are not described herein again.

Step 704: The VM transfers third request information to the vTPM driver component, where a destination party of the third request information is the vTPM service component.

In this embodiment, the third request information is used to request to perform a TPM operation, and the third request information is request information transferred by the VM to the vTPM driver component for the first time after the VM is started.

Step 705: The vTPM driver component transfers the third request information to the vTPM proxy component.

Step 706: The vTPM proxy component adds an identifier of the VM to the third request information, to obtain fourth request information.

Step 707: The vTPM proxy component transfers the fourth request information to a TrustZone driver component, where a destination party of the fourth request information is the vTPM service component.

Step 708: The TrustZone driver component transfers the fourth request information to the vTPM service component.

In this embodiment, steps 705 to 708 are similar to the foregoing steps 502 to 505. For details, refer to the foregoing steps 502 to 505. Details are not described herein again.

Step 709: The vTPM service component allocates a storage space to the VM based on the fourth request information.

After obtaining the fourth request information, the vTPM service component parses the fourth request information to obtain the identifier of the VM that is included in the fourth request information. The vTPM service component searches, based on the identifier of the VM that is included in the fourth request information, a volatile memory in a trusted execution environment for a storage space corresponding to the identifier of the VM. Because the fourth request information is request information transferred by the vTPM proxy component for the first time after the VM is started, the storage space corresponding to the identifier of the VM that is included in the fourth request information does not exist in the volatile memory in the trusted execution environment.

When the vTPM service component cannot find, in the volatile memory, the storage space corresponding to the identifier of the VM that is included in the fourth request information, the vTPM service component continues to search the non-volatile memory for the storage space corresponding to the identifier of the VM that is included in the fourth request information. If the storage space correspond-
ing to the identifier of the VM that is included in the fourth
request information exists in the non-volatile memory, the
vTPM service component allocates, in the volatile memory,
the storage space to the identifier of the VM that is included
in the fourth request information, and copies data in the
storage space corresponding to the identifier of the VM in
the non-volatile memory to the allocated storage space. If
the storage space corresponding to the identifier of the VM
that is included in the fourth request information does not
exist in the non-volatile memory, the vTPM service com-
ponent allocates, in the volatile memory, the storage space to
the identifier of the VM that is included in the fourth request
information, and performs a TPM initialization operation on
data in the allocated storage space.

In this embodiment, the vTPM service component
searches for the corresponding storage space based on the
identifier of the VM in a TPM operation request, and
determines, based on a search result, whether to allocate the
storage space to the identifier of the VM in the TPM
operation request, so as to allocate the corresponding storage
space to the identifier of the VM. Because the vTPM service
component can allocate the storage space based on the TPM
operation request, a process of establishing a session con-
nection in advance is omitted, and processing resources are
saved.

The foregoing describes a process in which the vTPM
service component allocates the storage space to the iden-
tifier of the VM when the VM is started. The following
describes a process in which the vTPM service component
recycles the storage space allocated to the identifier of the
VM when the VM is closed.

Figure 8:
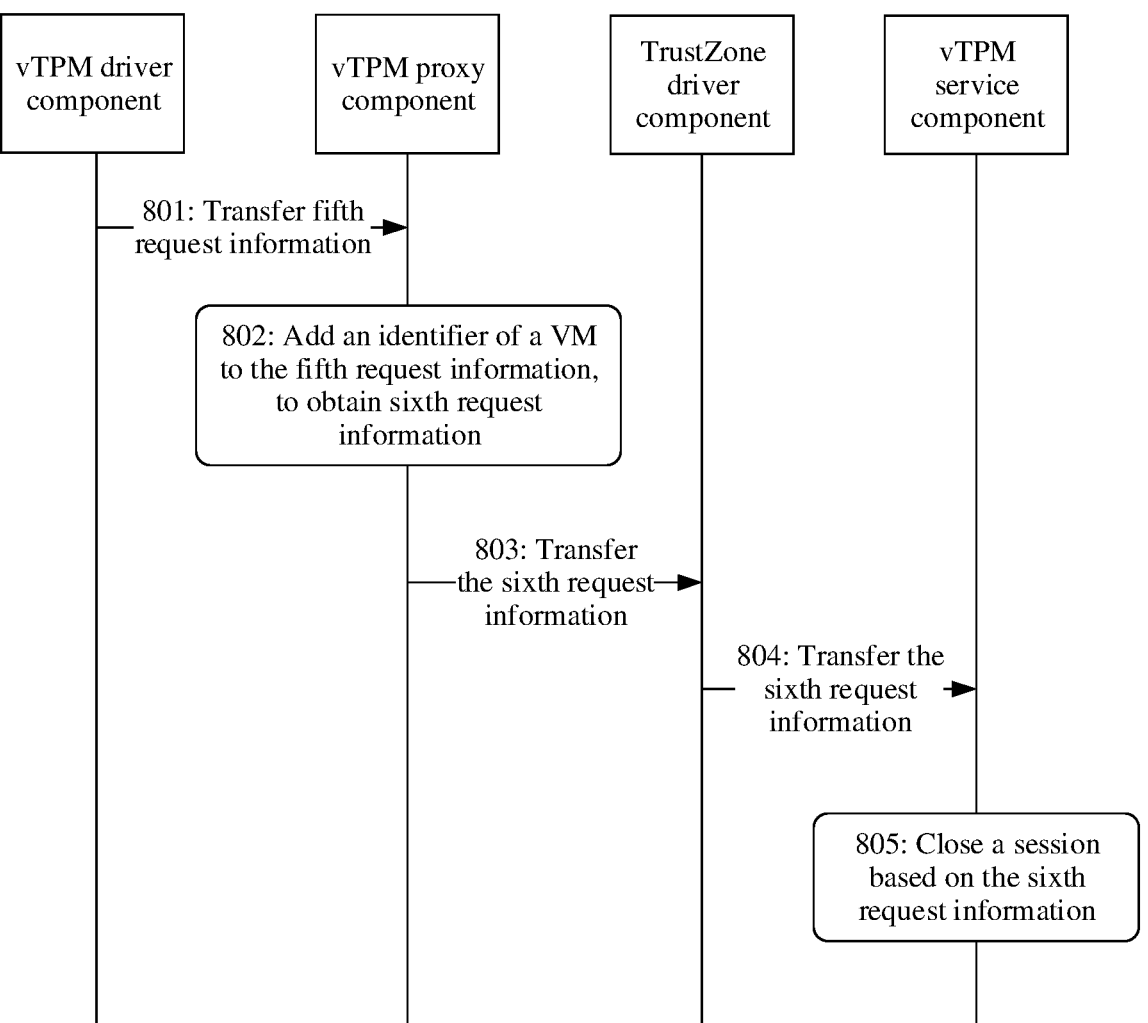
FIG. 8 is a schematic flowchart of closing a session by a vTPM service component according to an embodiment of the present disclosure.

FIG. 8 is a schematic flowchart of closing a session by a
vTPM service component according to an embodiment of
the present disclosure. As shown in FIG. 8, the following
steps are included.

Step 801: A vTPM driver component transfers fifth
request information to a vTPM proxy component,
where a destination party of the fifth request informa-
tion is a vTPM service component.

When the VM needs to be closed, the VM triggers a
corresponding vTPM driver component to transfer fifth
request information to the vTPM proxy component, where
the fifth request information is used to request to close a
session with the vTPM service component.

Step 802: The vTPM proxy component adds an identifier
of the VM to fifth request information, to obtain sixth
request information.

Similarly, after obtaining the fifth request information, the
vTPM proxy component obtains the identifier of the VM
based on a source of the fifth request information, and adds
the obtained identifier of the VM to the fifth request infor-
mation, to identify a source of the fifth request information.
A process in which the vTPM proxy component obtains the
identifier of the VM is similar to that in step 503. For details,
refer to descriptions in step 503. Details are not described
herein again.

Step 803: The vTPM proxy component transfers sixth
request information to the TrustZone driver component,
where a destination party of the sixth request informa-
tion is the vTPM service component.

Optionally, the vTPM proxy component transfers the
sixth request information to the TrustZone driver component
by invoking a close session (TEEC_CloseSession) function.
In addition, after the session between the VM and the vTPM
service component is closed, the vTPM proxy component
terminates context between the VM and an executable environment by invoking a context finalization (TEEC_Fi-
nalizeContext) function, to close a connection between the
VM and the executable environment.

Step 804: The TrustZone driver component transfers sixth
request information to the vTPM service component.

In this embodiment, step 804 is similar to step 505. For
details, refer to related descriptions of step 505. Details are
not described herein again.

Step 805: The vTPM service component closes the ses-
sion based on the sixth request information.

After obtaining the sixth request information, the vTPM
service component obtains the identifier of the VM in the
sixth request information, to determine the storage space
corresponding to the identifier of the VM. Optionally, after
the sixth request information is obtained, the vTPM service
component is triggered to invoke a session close interface
(TA_CloseSessionEntryPoint) function. The vTPM service
component parses the sixth request information by executing
the TA_CloseSessionEntryPoint function, to obtain the iden-
tifier of the VM that is included in the sixth request infor-
mation.

The vTPM service component searches the volatile
memory for the storage space corresponding to the identifier
of the VM that is included in the sixth request information
based on the identifier of the VM that is included in the sixth
request information, to obtain the storage space that is in the
volatile memory and that corresponds to the identifier of the
VM that is included in the sixth request information. Then,
the vTPM service component allocates, in the non-volatile
memory, the storage space to the identifier of the VM that is
included in the sixth request information, and copies data in
the found storage space in the volatile memory to the
allocated storage space in the non-volatile memory. After
copying of the data in the storage space in the volatile
memory is completed, the vTPM service component dis-
cards the data in the storage space in the volatile memory. In
this way, the storage space in the volatile memory is
recycled and utilization of the storage space in the volatile
memory is improved.

TPM data corresponding to the identifier of the VM in the
volatile memory is copied to the non-volatile memory when
the VM is closed, so that the TPM data corresponding to the
VM can be recovered when the VM is restarted, thereby
ensuring normal running of the VM.

Figure 9:
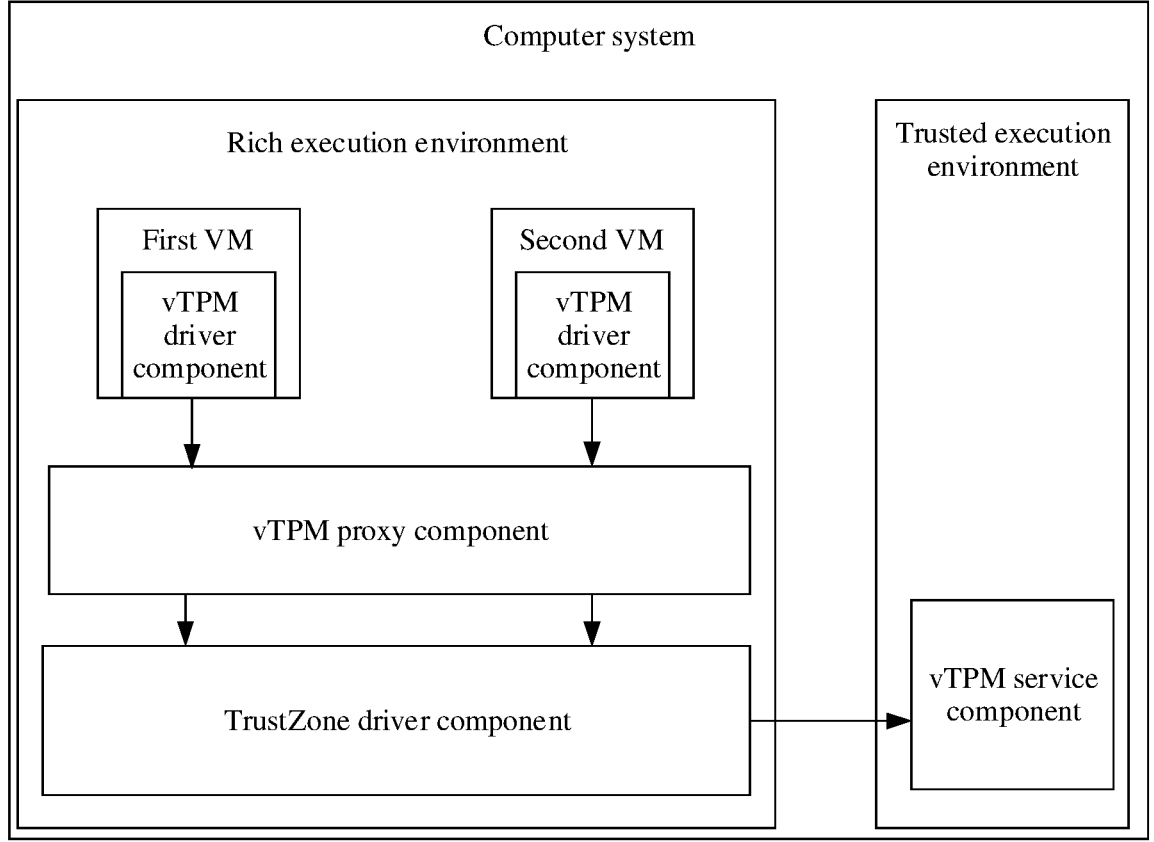
FIG. 9 is a schematic diagram of a structure of a computer system according to an embodiment of the present disclosure.

FIG. 9 is a schematic diagram of a structure of a computer
system according to an embodiment of the present disclo-
sure. As shown in FIG. 9, a trusted execution environment
and a rich execution environment run on a computer system,
a vTPM service component runs in the trusted execution
environment, and a first VM and a vTPM proxy component
run in the rich execution environment. The vTPM proxy
component is configured to: obtain first request information
from the first VM, obtain an identifier of the first VM, add
the identifier of the first VM to the first request information,
to obtain second request information, and transfer the sec-
ond request information to a TrustZone driver component.
The first request information is used to request the vTPM
service component to perform a TPM operation, the second
request information includes the identifier of the first VM,
and a destination party of the second request information is
the vTPM service component. The vTPM service compo-
nent is configured to: obtain the second request information
through the TrustZone driver component, and process the
second request information based on data in a first storage
space, where the first storage space is a storage space
corresponding to the identifier of the first VM in the trusted execution environment, and the first storage space is used to store TPM data of the first VM.

Optionally, the trusted execution environment further includes a second storage space, where the second storage space is used to store TPM data of a second VM, and the first storage space and the second storage space are storage spaces that do not overlap each other.

Optionally, the second request information further includes a command identifier and a to-be-processed parameter, and the command identifier is used to indicate a type of the to-be-executed TPM operation. The vTPM service component is further configured to: process the to-be-processed parameter based on the identifier in the second VM and the data in the first storage space to obtain target data, and transfer the target data to the TrustZone driver component, where a destination party of the target data is the vTPM proxy component. The vTPM proxy component is further configured to: obtain the target data, and transfer the target data to the first VM.

Optionally, the to-be-processed parameter includes a key handle and to-be-encrypted data. The vTPM service component is further configured to invoke a command invocation interface function, to obtain the command identifier and the to-be-processed parameter in the second request information. The vTPM service component is further configured to encrypt the to-be-encrypted data by using a key based on the command identifier, where the key is determined by the vTPM based on the key handle.

Optionally, the to-be-processed parameter includes a key handle and to-be-decrypted data. The vTPM service component is further configured to invoke a command invocation interface function, to obtain the command identifier and the to-be-processed parameter in the second request information. The vTPM service component is further configured to decrypt the to-be-decrypted data by using a key based on the command identifier, where the key is determined by the vTPM based on the key handle.

Optionally, the vTPM proxy component is further configured to: obtain third request information from the second VM, where the third request information is used to request to perform the TPM operation; obtain an identifier of the second VM; add the identifier of the second VM to the third request information, to obtain fourth request information, where the fourth request information includes the identifier of the second VM; and transfer the fourth request information to the TrustZone driver component, where a destination party of the fourth request information is the vTPM service component. The vTPM service component is configured to: obtain the fourth request information through the TrustZone driver component, and process the fourth request information based on the data in the second storage space, where the second storage space is a storage space corresponding to the identifier of the second VM in the trusted execution environment, and the second storage space is used to store the TPM data of the second VM.

Optionally, if the storage space corresponding to the identifier of the first VM does not exist in the trusted execution environment, the vTPM service component is further configured to: allocate a storage space to the identifier of the first VM in the trusted execution environment, and perform a TPM initialization operation on the data in the allocated storage space, so that the data in the allocated storage space is updated to the TPM initialization data, and the allocated storage space is used as the first storage space.

Optionally, the vTPM service component is further configured to: search a volatile memory of the computer for the storage space corresponding to the identifier of the first VM, and if the storage space corresponding to the identifier of the first VM does not exist in the volatile memory, allocate a storage space in the volatile memory.

Optionally, the second request information is transmitted in a first session, the first session is used to transmit information used to request to perform a TPM operation and/or the target data between the vTPM service component and the vTPM proxy component, and the target data is data obtained after the TPM operation is performed. The vTPM proxy component is further configured to: when the first VM is started, obtain the identifier of the first VM; generate fifth request information, where the fifth request information includes the identifier of the first VM; and transfer the fifth request information to the TrustZone driver component, where the fifth request information is used to request to establish the first session, and a destination party of the fifth request information is the vTPM service component. The vTPM service component is further configured to obtain the fifth request information through the TrustZone driver component. The vTPM service component allocates a storage space in the volatile memory of the computer, and uses the allocated storage space as the first storage space.

Optionally, the first session is a session corresponding to the identifier of the first VM. The vTPM service component is further configured to invoke a session open interface function based on the identifier of the first VM that is included in the fifth request information, to establish a first session corresponding to the identifier of the first VM and obtain an identifier of the first session. The vTPM service component is further configured to transfer the identifier of the first session to the TrustZone driver component, where a destination party of the identifier of the first session is the vTPM proxy component.

Optionally, the vTPM service component is further configured to: search a non-volatile memory of the computer for the storage space corresponding to the identifier of the first VM; and if the storage space corresponding to the identifier of the first VM exists in the non-volatile memory, allocate the storage space in the volatile memory, and copy data in the storage space corresponding to the identifier of the first VM in the non-volatile memory to the allocated storage space; or if the storage space corresponding to the identifier of the first VM does not exist in the non-volatile memory, allocate the storage space in the volatile memory.

Optionally, the vTPM service component is further configured to mark the allocated storage space based on the identifier of the first VM.

Optionally, the vTPM proxy component is further configured to: obtain sixth request information from the first VM, where the sixth request information is used to request to close the first session, obtain the identifier of the first VM, add the identifier of the first VM to the sixth request information, to obtain seventh request information, where the seventh request information includes the identifier of the first VM, and transfer the seventh request information to the TrustZone driver component, where a destination party of the seventh request information is the vTPM service component. The vTPM service component is further configured to: obtain the sixth request information, determine the first storage space based on the identifier of the first VM that is included in the sixth request information, and copy the data in the first storage space to a third storage space, where the third storage space is located in the non-volatile memory.

Optionally, the second request information is transferred by the TrustZone driver component to the vTPM service component in a monitor mode, and the TrustZone driver component runs in the rich execution environment of the computer.

It should be understood that the components in the computer system are separately used to implement various steps and methods implemented by the vTPM driver component, the vTPM proxy component, the TrustZone driver component, and the vTPM service component in the method embodiments. For specific details, refer to the foregoing method embodiments. For brevity, details are not described herein again.

Figure 10:
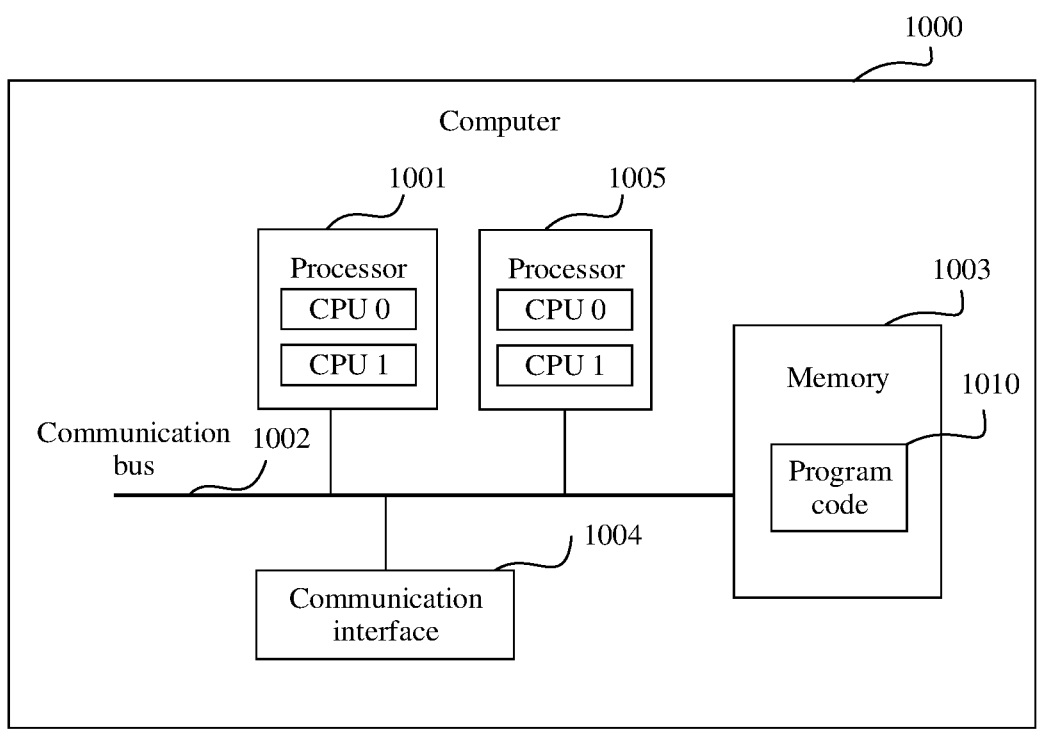
FIG. 10 is a schematic diagram of a structure of a computer according to an embodiment of the present disclosure.

FIG. 10 is a schematic diagram of a structure of a computer according to an embodiment of the present disclosure. A computer 1000 carries the foregoing computer system. The computer 1000 is implemented by a general bus architecture.

The computer 1000 includes at least one processor 1001, a communication bus 1002, a memory 1003, and at least one communications interface 1004.

Optionally, the processor 1001 is a general CPU, an NP, a microprocessor, or is one or more integrated circuits configured to implement the solutions of the present disclosure, for example, an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof.

The communication bus 1002 is configured to transmit information between the foregoing components. The communication bus 1002 is classified into an address bus, a data bus, a control bus, and the like. For ease of representation, only one thick line is used to represent the bus in the figure, but this does not mean that there is only one bus or only one type of bus.

Optionally, the memory 1003 is a read-only memory (ROM) or another type of static storage device that can store static information and an instruction. Alternatively, the memory 1003 is a random access memory (RAM) or another type of dynamic storage device that can store information and instructions. Alternatively, the memory 1003 is an electrically erasable programmable read-only memory (EE-PROM), a compact disc read-only memory (CD-ROM) or another compact disc storage, an optical disc storage (including a compact disc, a laser disc, an optical disc, a digital versatile disc, a Blu-ray disc, or the like), a magnetic disk storage medium or another magnetic storage device, or any other medium that can be configured to carry or store desired program code in a form of an instruction or a data structure and that can be accessed by a computer. However, the memory 1003 is not limited thereto. Optionally, the memory 1003 exists independently, and is connected to the processor 1001 through the communication bus 1002. Optionally, the memory 1003 and the processor 1001 are integrated together.

The communications interface 1004 is configured to communicate with another device or a communication network through any transceiver-type apparatus. The communications interface 1004 includes a wired communications interface. Optionally, the communications interface 1004 further includes a wireless communications interface. The wired communications interface may be, for example, an Ethernet interface. The Ethernet interface is an optical interface, an electrical interface, or a combination thereof. The wireless communications interface is a wireless local area network (WLAN) interface, a cellular network communications interface, a combination thereof, or the like.

During specific implementation, in an embodiment, the processor 1001 may include one or more CPUs, such as a CPU 0 and a CPU 1 shown in FIG. 10.

In a specific implementation, in an embodiment, the computer 1000 includes a plurality of processors, for example, the processor 1001 and a processor 1005 shown in FIG. 10. Each of the processors is a single-core processor (single-CPU) or a multi-core processor (multi-CPU). The processor herein is one or more devices, circuits, and/or processing cores configured to process data (for example, computer program instructions).

In some embodiments, the memory 1003 is configured to store program code 1010 for performing the solutions of the present disclosure, and the processor 1001 executes the program code 1010 stored in the memory 1003. In other words, the computer 1000 implements the foregoing method embodiments by using the processor 1001 and the program code 1010 in the memory 1003.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in the present disclosure, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of the present disclosure may be integrated into one processing unit, each of the units may exist alone physically, or two or more units may be integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of the present disclosure essentially, or the part contributing to the conventional technology, or all or some of the technical solutions may be implemented in the form of a software product. The computer software product is stored in a storage medium and includes several instructions for instructing a computer device (which may be a personal computer, a server, or a network device) to perform all or some of the steps of the methods described in embodiments of the present disclosure. The foregoing storage medium includes any medium that can store program code, such as a USB flash drive, a removable hard disk, a read-only memory, a random access memory, a magnetic disk, or an optical disc.

What is claimed is:

1. A virtual trusted platform module (vTPM) implementation method, comprising:

obtaining, by a vTPM service component, first request information from a vTPM proxy component, wherein the first request information comprises an identifier of a first virtual machine (VM), the first request information requests to perform a TPM operation, the vTPM service component runs in a trusted execution environment of a computer, and the first VM and the vTPM proxy component run in a rich execution environment of the computer; and processing, by the vTPM service component, the first request information based on data in a first storage space, wherein the first storage space is a storage space in the trusted execution environment and corresponds to the identifier of the first VM, and the first storage space is configured to store TPM data of the first VM.

2. The vTPM implementation method according to claim 1, wherein the trusted execution environment further comprises a second storage space, wherein the second storage space is configured to store TPM data of a second VM in the computer, and the first storage space and the second storage space do not overlap each other.

3. The vTPM implementation method according to claim 1, wherein the first request information further comprises a command identifier and a to-be-processed parameter, and the command identifier indicates a type of a to-be-executed TPM operation; and the processing, by the vTPM service component, the first request information based on data in a first storage space comprises:

processing, by the vTPM service component, the to-be-processed parameter based on the command identifier and the data in the first storage space, to obtain target data; and transferring, by the vTPM service component, the target data to a TrustZone driver component, wherein a destination party of the target data is the vTPM proxy component.

4. The vTPM implementation method according to claim 3, wherein the to-be-processed parameter comprises a key handle and to-be-encrypted data; and the processing, by the vTPM service component, the to-be-processed parameter based on the command identifier and the data in the first storage space, to obtain target data comprises:

invoking, by the vTPM service component, a command invocation interface function, to obtain the command identifier and the to-be-processed parameter in the first request information; and encrypting, by the vTPM service component, the to-be-encrypted data by using a key based on the command identifier, wherein the key is determined by the vTPM based on the key handle.

5. The vTPM implementation method according to claim 3, wherein the to-be-processed parameter comprises a key handle and to-be-decrypted data; and the processing, by the vTPM service component, the to-be-processed parameter based on the command identifier and the data in the first storage space, to obtain target data comprises:

invoking, by the vTPM service component, a command invocation interface function, to obtain the command identifier and the to-be-processed parameter in the first request information; and decrypting, by the vTPM service component, the to-be-decrypted data by using a key based on the command identifier, wherein the key is determined by the vTPM based on the key handle.

6. The vTPM implementation method according to claim 3, wherein the first request information is transmitted in a first session, and the first session is configured to transmit the first request information and/or the target data between the vTPM service component and the vTPM proxy component; and the method further comprises:

obtaining, by the vTPM service component, second request information from the vTPM proxy component, wherein the second request information comprises the identifier of the first VM, and the second request information requests to establish the first session; and allocating, by the vTPM service component, a storage space in a volatile memory of the computer based on the second request information, wherein the allocated storage space is used as the first storage space.

7. The vTPM implementation method according to claim 6, wherein after the allocating, by the vTPM service component, the storage space in the volatile memory, the method further comprises:

marking, by the vTPM service component, the allocated storage space based on the identifier of the first VM.

8. The vTPM implementation method according to claim 6, further comprising:

obtaining, by the vTPM service component, third request information, wherein the third request information is transmitted in the first session, the third request information comprises the identifier of the first VM, and the third request information requests to close the first session;

determining, by the vTPM service component, the first storage space based on the identifier of the first VM that is comprised in the third request information; and copying, by the vTPM service component, the data in the first storage space to a third storage space, wherein the third storage space is located in a non-volatile memory.

9. The vTPM implementation method according to claim 1, wherein the first request information is transferred by a TrustZone driver component to the vTPM service component in a monitor mode, and the TrustZone driver component runs in the rich execution environment of the computer.

10. A vTPM implementation method, comprising:

obtaining, by a vTPM proxy component, first request information from a first VM, wherein the first request information requests a vTPM service component to perform a TPM operation, the first VM and the vTPM proxy component run in a rich execution environment of a computer, and the vTPM service component runs in a trusted execution environment of the computer;

obtaining, by the vTPM proxy component, an identifier of the first VM;

adding, by the vTPM proxy component, the identifier of the first VM to the first request information, to obtain second request information, wherein the second request information comprises the identifier of the first VM; and transferring, by the vTPM proxy component, the second request information to a TrustZone driver component that runs in the trusted execution environment of the computer, wherein a destination party of the second request information is the vTPM service component.

11. The vTPM implementation method according to claim 10, further comprising:

obtaining, by the vTPM proxy component, third request information from a second VM, wherein the third request information requests to perform a TPM operation;

obtaining, by the vTPM proxy component, an identifier of the second VM;

adding, by the vTPM proxy component, the identifier of the second VM to the third request information, to obtain fourth request information, wherein the fourth request information comprises the identifier of the second VM; and transferring, by the vTPM proxy component, the fourth request information to the TrustZone driver component, wherein a destination party of the fourth request information is the vTPM service component.

12. The vTPM implementation method according to claim 10, further comprising:

when the first VM is started, obtaining, by the vTPM proxy component, the identifier of the first VM;

generating, by the vTPM proxy component, fifth request information, wherein the fifth request information requests to establish a session with the vTPM service component, and the fifth request information comprises the identifier of the first VM; and transferring, by the vTPM proxy component, the fifth request information to the TrustZone driver component, wherein a destination party of the fifth request information is the vTPM service component.

13. The vTPM implementation method according to claim 12, further comprising:

obtaining, by the vTPM proxy component, sixth request information from the first VM, wherein the sixth request information requests to close the session with the vTPM service component;

obtaining, by the vTPM proxy component, the identifier of the first VM;

adding, by the vTPM proxy component, the identifier of the first VM to the sixth request information, to obtain seventh request information, wherein the seventh request information comprises the identifier of the first VM; and transferring, by the vTPM proxy component, the seventh request information to the TrustZone driver component, wherein a destination party of the seventh request information is the vTPM service component.

14. A computer, comprising at least one processor and a memory coupled with the at least one processor, wherein the memory comprising instructions that, when executed by the at least one processor, cause the computer to:

generate a rich execution environment and a trusted execution environment;

obtain, by a vTPM service component, first request information from a vTPM proxy component, wherein the first request information comprises an identifier of a first virtual machine (VM), the first request information requests to perform a TPM operation, the vTPM service component runs in the trusted execution environment of the computer, and the first VM and the vTPM proxy component run in the rich execution environment of the computer; and process, by the vTPM service component, the first request information based on data in a first storage space, wherein the first storage space is a storage space in the trusted execution environment and corresponds to the identifier of the first VM, and the first storage space is configured to store TPM data of the first VM.

15. The computer according to claim 14, wherein the trusted execution environment further comprises a second storage space, wherein the second storage space is configured to store TPM data of a second VM in the computer, and the first storage space and the second storage space do not overlap each other.

16. The computer according to claim 14, wherein the first request information further comprises a command identifier and a to-be-processed parameter, and the command identifier indicates a type of a to-be-executed TPM operation;

the processing, by the vTPM service component, the first request information based on data in a first storage space comprises:

processing, by the vTPM service component, the to-be-processed parameter based on the command identifier and the data in the first storage space, to obtain target data; and transferring, by the vTPM service component, the target data to a TrustZone driver component, wherein a destination party of the target data is the vTPM proxy component.

17. The computer according to claim 16, wherein the first request information is transmitted in a first session, and the first session is configured to transmit the first request information and/or the target data between the vTPM service component and the vTPM proxy component; and wherein the instructions, when executed by the at least one processor, further cause the computer to:

obtain, by the vTPM service component, second request information from the vTPM proxy component, wherein the second request information comprises the identifier of the first VM, and the second request information requests to establish the first session; and allocate, by the vTPM service component, a storage space in a volatile memory of the computer based on the second request information, wherein the allocated storage space is used as the first storage space.

18. The computer according to claim 17, wherein the instructions, when executed by the at least one processor, further cause the computer to:

obtain, by the vTPM service component, third request information, wherein the third request information is transmitted in the first session, the third request information comprises the identifier of the first VM, and the third request information requests to close the first session;

determine, by the vTPM service component, the first storage space based on the identifier of the first VM that is comprised in the third request information; and copy, by the vTPM service component, the data in the first storage space to a third storage space, wherein the third storage space is located in a non-volatile memory.

19. A computer, comprising at least one processor and a memory coupled with the at least one processor, wherein the memory comprising instructions that, when executed by the at least one processor, cause the computer to:

generate a rich execution environment and a trusted execution environment;

obtain, by a vTPM proxy component, first request information from a first VM, wherein the first request information requests a vTPM service component to perform a TPM operation, the first VM and the vTPM proxy component run in a rich execution environment of the computer, and the vTPM service component runs in a trusted execution environment of the computer;

obtain, by the vTPM proxy component, an identifier of the first VM;

add, by the vTPM proxy component, the identifier of the first VM to the first request information, to obtain second request information, wherein the second request information comprises the identifier of the first VM; and transfer, by the vTPM proxy component, the second request information to a TrustZone driver component that runs in the trusted execution environment of the computer, wherein a destination party of the second request information is the vTPM service component.

20. The computer according to claim 19, wherein the instructions, when executed by the at least one processor, further cause the computer to:

obtain, by the vTPM proxy component, third request information from a second VM, wherein the third request information requests to perform a TPM operation;

obtain, by the vTPM proxy component, an identifier of the second VM;

add, by the vTPM proxy component, the identifier of the second VM to the third request information, to obtain fourth request information, wherein the fourth request information comprises the identifier of the second VM; and transfer, by the vTPM proxy component, the fourth request information to the TrustZone driver component, wherein a destination party of the fourth request information is the vTPM service component.

\* \* \* \* \*